United States Patent [19]
Hamanaka et al.

[11] Patent Number: 5,386,566
[45] Date of Patent: Jan. 31, 1995

[54] INTER-PROCESSOR COMMUNICATION METHOD FOR TRANSMITTING DATA AND PROCESSOR DEPENDENT INFORMATION PREDETERMINED FOR A RECEIVING PROCESS OF ANOTHER PROCESSOR

[75] Inventors: Naoki Hamanaka; Junji Nakagoshi, both of Tokyo; Tatsuo Higuchi, Fuchu; Hiroyuki Chiba, Hachioji; Shin'ichi Shutoh, Kokubunji; Shigeo Takeuchi, Hanno; Yasuhiro Ogata, Akishima; Taturu Toba, Kunitachi, all of Japan

[73] Assignees: Hitachi, Ltd.; Hitachi VLSI Engineering Corporation, both of Tokyo, Japan

[21] Appl. No.: 853,427

[22] Filed: Mar. 18, 1992

[30] Foreign Application Priority Data

Mar. 20, 1991 [JP] Japan .................................. 3-056469
Sep. 20, 1991 [JP] Japan .................................. 3-241094

[51] Int. Cl.6 .............................................. G06F 13/00
[52] U.S. Cl. .............................. 395/700; 364/DIG. 1; 364/242.3; 364/255.1; 364/256.3
[58] Field of Search ................. 395/700; 364/DIG. 1, 364/242.3, 255.1, 256.3, 256.5

[56] References Cited

U.S. PATENT DOCUMENTS 4,956,771 9/1990 Neustaedter ...................... 364/200
5,121,487 6/1992 Bechtolsheim .................... 395/325

*Primary Examiner*—Kevin A. Kriess
*Assistant Examiner*—A. Katbab
*Attorney, Agent, or Firm*—Antonelli, Terry, Stout & Kraus

[57] ABSTRACT

In a parallel computer, in order to reduce the overhead of data transmissions between the processes, a data transmission from the virtual space of a process in a certain cluster to the virtual space of a process in other cluster is executed without copying the data to the buffer provided within the operating system. The real communication area resident in the real memory is provided in a part of the virtual space of the process, and an identifier unique within the cluster is given to the communication area. When the transmission process has issued a transmission instruction at the time of data transmission, the cluster address of the cluster in which the transmission destination process exists and the identifier of the communication area are determined based on the name of the transmission destination process. Then, the data is directly transmitted between the mutual real communication areas of the transmission originating process and the transmission destination process. Overhead for the data transmission between the processes can be reduced by avoiding making a copy of the data between the user space and the buffer provided within the operating system at the time of data transmission between the processes.

16 Claims, 22 Drawing Sheets

F : PAGE FIXED FLAG

FIG. 9

| BASE ADDRESS BASE | SIZE LN |
|---|---|
|   |   |
| ⋮ | ⋮ |

16. COMMUNICATION AREA TABLE

FIG. 10

| REAL ADDRESS OF REQUEST STRUCTURE UNIT |
|---|
|   |
| ⋮ |

17 REQUEST TABLE

V(VALID): 0 WHEN CORRESPONDING ENTRY IS VALID
CL(CLUSTER): CLUSTER NUMBER
PTO(PAGE TABLE ORIGIN): PAGE TABLE ORIGIN

OP : OPERATION CODE
BASE : VALUE TO BE SET TO BASE

OP : OPERATION CODE
LEN : VALUE TO BE SET TO LEN

OP : OPERATION CODE
PATH : VALUE OF TRANSFER BUS
VA1 : SOURCE ADDRESS (VIRTUAL ADDRESS)
VA2 : DESTINATION ADDRESS (VIRTUAL ADDRESS)

OP : OPERATION CODE
PATH : VALUE OF TRANSFER PATH

OP : OPERATION CODE
VA2 : DESTINATION ADDRESS
   (VIRTUAL ADDRESS)
VA1 : SOURCE ADDRESS
   (VIRTUAL ADDRESS)

INTER-PROCESSOR COMMUNICATION METHOD FOR TRANSMITTING DATA AND PROCESSOR DEPENDENT INFORMATION PREDETERMINED FOR A RECEIVING PROCESS OF ANOTHER PROCESSOR

BACKGROUND OF THE INVENTION

The present invention relates to a method for data transmission between processors in a parallel processor aiming at achieving a high-speed calculation, more particularly, to a MIMD-type parallel processor having distributed memories.

There have been broadly three types of techniques for achieving a high-speed operation by using a plurality of processors.

The first type of technique is the one for structuring a parallel processor by using at least dozens of processors to achieve an extreme improvement in the performance of the operation in comparison with the processor using only one processor. It is conditional that this type of technique uses a large number of processors. Therefore, it is important to have a reduced size for each processor, which eventually has limited the function of each processor as compared with the function of a general purpose computer. For example, the compact processor for the first type of technique has omitted the address translation mechanism for realizing a virtual storage. There have been techniques of a parallel processor using a large number of processors according to which a plurality of processes can be executed by one processor, as disclosed, for example, in the JP-A-62-274451, or the corresponding EPC patent application publication No. 255,857 (application No. 87 107 576.8 (filed on May 22, 1987)) or the U.S. patent application Ser. No. 07/379,230 (filed on Jul. 13, 1989, and now issued as U.S. Pat. No. 5,301,322 on Apr. 5, 1994) following the corresponding U.S. patent application Ser. No. 07/52,871 (filed on May 22, 1987) which was abandoned. However, none of the processors according to these techniques are equipped with the function for realizing a virtual storage.

On the other hand, as the second type of technique, there is a device of a parallel computer comprising a plurality of processing elements, each having a local memory, according to which data can be written in a local memory from other processing element. When a certain processing element transmits data using a local memory of other processing element, tags are provided to a part or the whole of the words in the local memory, and these tags display whether the content of the words is valid or invalid. This type of device is discussed in, for example, the JP-A-H1-194055 or the corresponding EPC patent application publication No. 326,164 (application No. 89 101 462.3 (filed on Dec. 7, 1990)) or the corresponding U.S. patent application No. 07/303,626 (filed on Jan. 27, 1989 now issued as U.S. Pat. No. 5,297,255 on Mar. 22, 1994).

The third type of technique is a so-called distributed data processing technique for connecting a few general purpose computers with a local area network or the like. For example, the distributed data processing technique in the work station with a UNIX operating system developed and currently being licensed by the UNIX System Laboratries Ltd. corresponds to this third type of technique. In this type of technique, it is conditional that general purpose computers are used. Each processor has a structure as a general purpose computer and an adapter for communication is added to each general purpose computer. Each processor is loaded with a general purpose operating system and the communication adapter is handled as one of the resources including disk input/output units that are managed by the operating system. Therefore, communications between the processors are carried out through a system call. In other words, when a process for executing a program prepared by the user is going to transmit data to other process, it is necessary to call the program of the operating system and to carry out the program.

FIG. 30 shows the operation of data transmission according to the third type of prior art technique, for example, a reference: S. L. Leffler et al., "The Design and Implementation of the 4.3 BSD UNIX Operating System", Addison-Wesley Publishing Company, pp. 384-386. First, the process for transmitting data executes the system call for data transmission. Then, the operating system having received the system call copies the data to be transmitted, together with parameters relevant to the process of the transmission destination, to the buffer in the operating system. Then, the operating processor checks the parameters, sets the parameters and the data to the transmission circuit from the buffer area in the operating system, and commands data transmission to the transmission circuit.

When the transmission circuit has transmitted the data and the data has arrived at the receiving circuit of the processor which receives the data, the receiving circuit stores the parameters and the data in the buffer inside the receiving circuit, and makes a notice to the operating system in the receiving processor. Upon receiving the notice, the operating system in the receiving processor makes a copy of the parameters and the data from the buffer inside the receiving circuit to the buffer inside the operating system. The operating system then inspects the parameters and the data. If there is no problem as a result of the inspection, the operating system transmits an acknowledge signal (ACK) to the transmission originating processor. The processor having received the ACK releases the buffer area, inside the operating system, which was secured when there was a request for the transmission of the parameters and the data which caused the transmission of the ACK from the operating system.

When the process which is going to receive the data has executed a system call for receiving the data, the operating system in the receiving processor checks whether necessary data has all arrived already. If all the necessary data has already arrived, the operating system makes a copy of the data from the area inside the operating system which stores the data to the area inside the process which has executed the system call. If the data has not yet arrived, the operating system waits for the receiving of the data, and executes the above operation for the data receiving upon receiving the data.

PROBLEMS THAT THE INVENTION IS TO SOLVE

According to the above first type of prior art technique, there is a limitation to the function of each processor, and the user is required to prepare a program by being sufficiently conscious of hardware features such as a memory capacity of each processor within the limited function of each processor.

On the other hand, according to the above second type of prior art technique, there is no overhead of the above data copy. However, when a plurality of processes are to be operated in one cluster and when a transmission process in another cluster is to transmit data to a specific receiving process among said plurality of processes through a local memory, there is a risk that the transmission process may invalidly alter the data of the process operating at the same time with the receiving process in the same cluster.

According to the above third type of prior art technique, an operating system is operating in each cluster so that a plurality of processes can operate simultaneously in one cluster. Therefore, even if the number of user processes generated by the program to be executed by a parallel computer is not equal to the number of clusters allocated to execute this program, it is possible to execute this program by allocating a virtual space corresponding to each user process. Accordingly, data transmission between the user processes effectively means the transmission of data in the virtual space corresponding to the transmission originating process to the virtual space corresponding to the transmission destination process. Even if there is an error in the user program, the protection mechanism or the like of the operating system can provide control to avoid an unreasonable destruction of data of the process which is irrelevant to this program.

In order to transmit data at a high speed from a certain cluster to an external unit of this cluster, such as, for example, a network for connecting between clusters, DMA transfer is usually used. DMA transfer is realized by using a circuit called a DMA controller which is structured to continuously generate a memory address by hardware and to continuously read or write data from or into the memory. However, when data in a virtual space of a transmission originating process is to be transmitted to the network by using the DMA controller, there is no guarantee that the data in the virtual storage to be transmitted exists in the actual memory of the cluster. Therefore, in order to guarantee that the data to be transmitted exists in the real memory, it is necessary to carry out page-in when necessary and then transmit the data to the DMA controller. Page-in is a function which is permitted to an operating system only, so that an operating system is unavoidably included in data transmission according to the prior-art technique.

Even if a continuous data transmission has been carried out by the DMA controller after the above preparation, there is no guarantee that an area for storing the transmitted data in the virtual space for the transmission destination process has been allocated to the real memory of the transmission destination cluster. Therefore, according to the prior-art technique, the operating system in the transmission destination cluster has, in its inside, a buffer (a receiving buffer) provided on the real memory for storing the transmitted data. The operating system once stores the received data in the receiving buffer, carries out a page-in after that when necessary, and then transmits the data to the data storage area in the virtual space corresponding to the transmission destination process. In this case, the above page-in needs to be carried out by involving the operating system.

Even if the above receiving buffer has been provided in the transmission destination cluster, for example, there is no means for the transmission destination cluster to know in advance when and how much volume of data the transmission originating cluster is going to transmit to the transmission destination cluster. Accordingly, it is not possible to secure in advance the necessary size of the receiving buffer. Therefore, according to the prior-art technique, when the volume of transmitted data is larger than estimated and exceeds the secured size of the receiving buffer, the transmission destination cluster does not receive the data transmitted by the transmission originating cluster, but the data is retransmitted from the transmission originating cluster to the transmission destination cluster after a new receiving buffer of the necessary size has been secured at the transmission destination cluster.

In order to enable the above retransmission, according to the prior-art technique, the operating system of the transmission originating cluster has a transmission buffer in the inside, to store therein data to be transmitted until it is confirmed that the data to be transmitted has been securely received by the transmission destination cluster.

When the transmission buffer is provided in the real memory, the data to be transmitted, stored in the transmission buffer, can be continuously transmitted to the network by the DMA controller. Thus, according to the prior-art technique, in transmitting data in the virtual space corresponding to the transmission originating process to the transmission destination process, the transmission originating cluster carries out the page-in, when necessary, as described above, transfers the data to be transmitted, stored in the virtual space, to the transmission buffer in the real memory, and then transmits the data stored in the transmission buffer to the network by the DMA controller.

As described above, according to the prior-art technique, when data is to be transmitted from the virtual space corresponding to the transmission originating process to the virtual space corresponding to the transmission destination process, the data to be transmitted passes through the transmission buffer in the operating system of the transmission originating cluster, via the operating system, to the receiving buffer in the operating system of the transmission destination cluster, via the operating system. Making a copy of data to the buffer brings about an overhead which is almost proportional to the length of data to be transmitted. This overhead may extremely lower the performance of a parallel computer.

SUMMARY OF THE INVENTION

It is an object of the present invention to reduce overhead arising from the use of an operating system when a plurality of processes operate in the same cluster and a certain cluster transfers data to the process which operates on a different cluster.

In the parallel processor comprising a plurality of clusters, each including at least one independently operable processor and a memory shared by at least one processor, and a network for connecting the plurality of clusters, with at least one virtual space being allocated to each of the plurality of clusters, and at least one process being executed in the virtual space under the control of the operating system, the above object of the present invention is achieved by such an arrangement that a process has a virtual communication area resident in the memory within the cluster and disposed in the virtual space, and data to be transmitted from a process (a transmission originating process) under execution in a certain cluster (a transmission originating cluster) to another process (a transmission destination process)

allocated to another cluster (a transmission destination cluster) is read from a real communication area allocated to the transmission originating process resident within the memory of the transmission originating cluster, the read data is transmitted from the transmission originating cluster to the transmission destination cluster, and the data is written in a real communication area allocated to the transmission destination process resident within the memory of the transmission destination cluster.

BRIEF DESCRIPTION OF THE DRAWINGS

FIG. 9 is a structure diagram of a communication area table;

FIG. 10 is a structure diagram of a request table;

EMBODIMENTS

Embodiment 1

Figure 1:
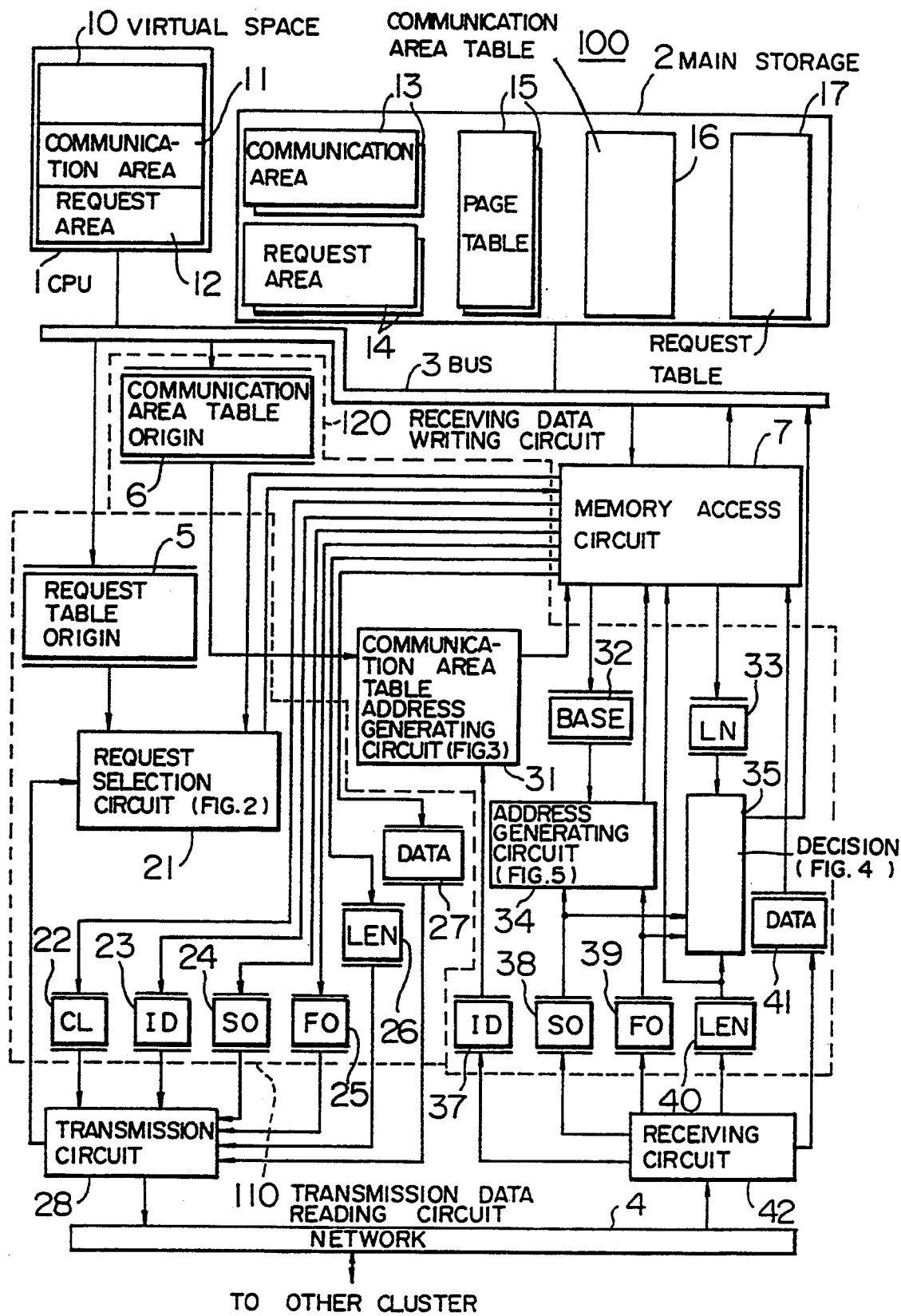
FIG. 1 is a configuration diagram of a parallel computer relating to a first embodiment of the present invention.

A first embodiment of the present invention will be explained below with reference to FIG. 1. FIG. 1 shows a parallel computer relating to the present invention. In the present embodiment, a plurality of clusters 100 are connected by a network 4. In FIG. 1, the configuration of one of the clusters 100 is shown and the configurations of the other clusters 100 are not shown. In FIG. 1, 1 designates a CPU, which may have the structure same as the structure of a microprocessor according to the prior-art techniques. In FIG. 1, only one CPU is shown for simplicity, but each cluster 100 has a tightly coupled multiprocessor consisting of at least two CPUs. However, according to the present invention, it has also effective if each cluster 100 is a single processor. 2 designates a memory used as a main storage of the cluster 100. An access to the main storage 2 is made from the CPU 1 or an external device (not shown) through a bus 3, by using the prior-art technique. 4 designates a network for connecting the clusters 100. When an address of a transmission destination cluster has been assigned from a certain cluster, the network 4 transmits data to the transmission destination cluster (not shown) of this address.

110 designates a transmission data read circuit for reading data to be transmitted from the memory 2. 28 designates a transmission circuit for transmitting the read transmission data, in a packet form, to the network 4. 42 designates a circuit for receiving a packet from the network 4. 120 designates a receiving data write circuit for writing into the memory 2 received data in the received packet. 7 designates a memory access circuit for making an access to the memory 2 to read transmission data or to write received data.

In the CPU 1, a user process is executed in the same manner as the process which is executed under the UNIX system that is an operating system developed and currently being licensed by the UNIX System Laboratories Ltd. in the U.S.A. One virtual space exists corresponding to one user process. On FIG. 1, only one virtual space 10 is shown in the CPU 1 to facilitate the explanation. A virtual communication area 11 for transmission data and receiving data and a virtual request area 12 for the information to be attached to the transmission data are provided in the virtual space 10.

The memory 2 is provided with a real communication area 13 in which the virtual communication area 11 corresponding to each user process is mapped, a real request area 14 in which the virtual request area 12 provided for each user process is mapped, a page table 15 for address translation provided for each user process and a communication area table 16 for making an access to a plurality of communication areas 13 within this cluster.

According to the present embodiment, it is so structured that a user process to be executed in a certain cluster writes transmission data in the real communication area 13 within this cluster without involving the operating system which controls this cluster, that the transmission data reading circuit 110 reads the transmission data without involving the operating system, that the receiving data write circuit 120 writes the data received from other cluster in the real communication area 13 without involving the operating system, and the user process reads the data without involving the operating system.

Figure 6:
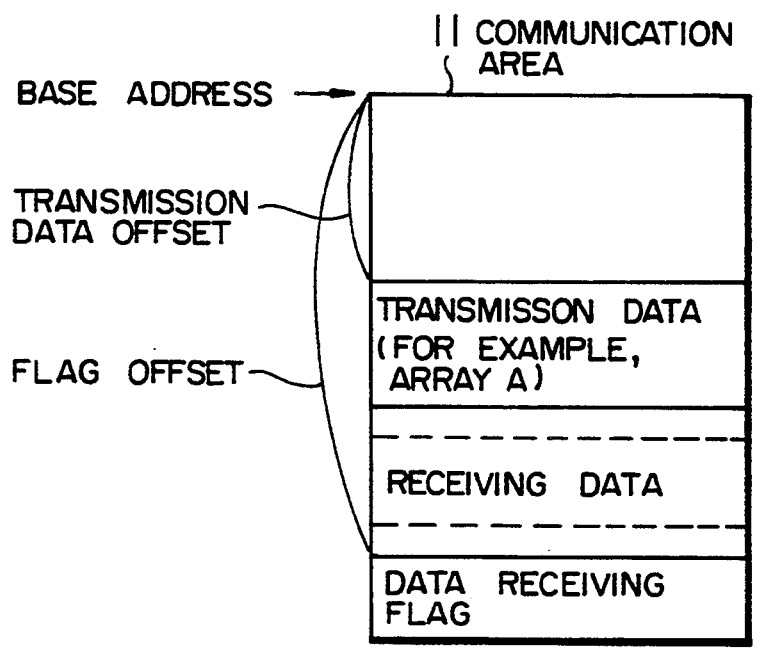
FIG. 6 is a structure diagram of a communication area.

FIG. 6 shows a structure of the virtual communication area 11. The virtual communication area 11 is disposed with data to be transmitted from the user process (for example, an array A, variables) or data received from the another cluster and a data receiving flag. This area is an area which mainly aims at an exchange of data with a process disposed in another cluster.

Figure 7:
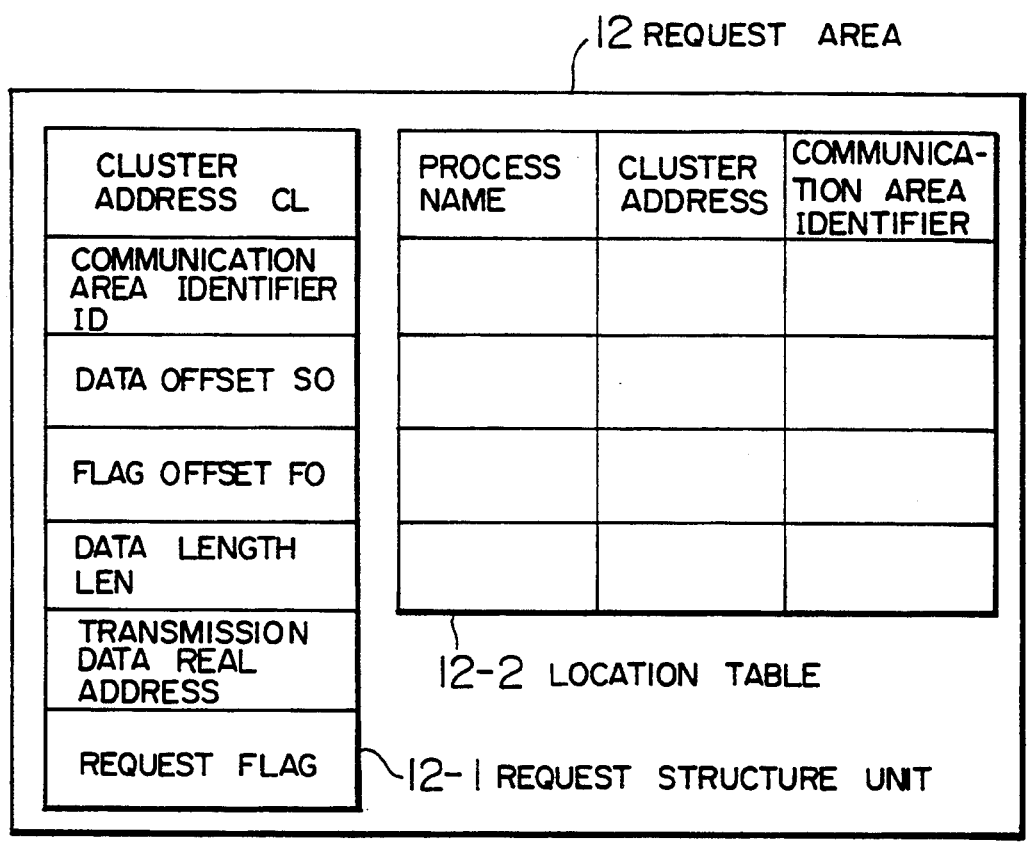
FIG. 7 is a structure diagram of a request area.

FIG. 7 shows a structure of the virtual request area 12. The virtual request area 12 is an area in which a library function utilized by the user process makes an access. The request area 12 has at least one request structure unit 12-1 and a location table 12-2. The request structure unit 12-1 stores a data transmission request which is dispatched by a process corresponding to the virtual space 10 where the request area 12 is located to a process in other cluster and parameters attached to this data transmission request. The location table 12-2 holds the information relating to the process started by other clusters.

FIG. 9 shows a structure of the communication area table 16. The communication area table 16 consists of a plurality of entries each corresponding to one communication area. Each entry holds a base address BASE of the corresponding communication area and a size LN of this area.

FIG. 10 shows a structure of the request table 17. The request table 17 has a plurality of entries each for storing the real address. If the virtual request structure unit 12-1 (FIG. 7) in the virtual request area 12 in any virtual space.

Figure 8:
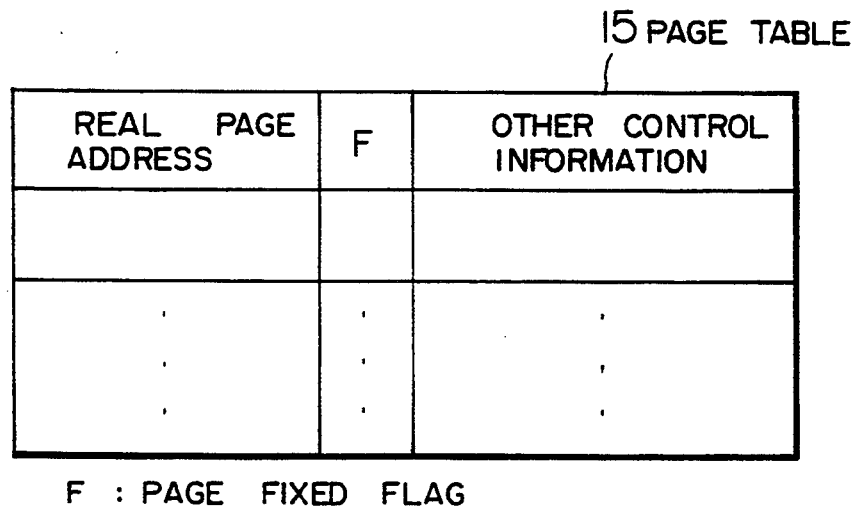
FIG. 8 is a structure diagram of a page table.

FIG. 8 shows a structure of the page table 15. Each entry of the page table 15 has a real page address field, a page fixed flag field and other control information. When a flag F for showing a page fix is being stored in the page fixed flag field, the operating system controls such that the real page corresponding to this entry is not paged out. The column of the "other control information" stores information similar to a dynamic address translation according to the prior-art technique.

Operation of the parallel computer relating to the present embodiment will be explained. Initialization of the parallel computer will be explained first. Each cluster has an equipment necessary for initializing the operation, such as a magnetic disk unit, which is not shown to simplify the drawing. When the power source for the system has been turned on, each cluster loads an initialization program in the same manner as the tightly coupled multiprocessor according to the prior-art technique, so that an operating system in each cluster starts independently. After each operating system in each cluster has been initialized, the operating system can start data exchanges with an operating system of any desired cluster by using the prior-art technique such as the TCP/IP protocol through the network 4 or the network according to the prior-art technique which is not shown.

In the present embodiment, the following operations are further carried out when the operating system has been initialized. The operating system in each cluster creates the communication area table 16 on the memory 2 and sets the header address of this table to a communication area table origin register 6 through the bus 3. Then, the operating system creates the request table 17 on the main storage 2 and sets the header address of the request table 17 to a request table origin register 5. Contents of the table 17 have not yet been written.

Initialization of the user process will be explained next.

At first, a user instructs a process initialization to the operating system of each cluster. Then, the operating system having been instructed the process initialization creates the page table 15 on the memory 2 to produce the virtual space 10 corresponding to the process of which initialization has been instructed. This is done in the same manner as the prior-art technique. Next, the virtual communication area 11 is initialized as follows. A continuous real address area of the size assigned by the programmer or the compiler is secured on the memory 2 and this area is set as the real communication area 13. Then, the address of this real communication area 13 is written sequentially starting from the header in the real page address field of the entry of the page table 15 corresponding to the virtual address of the communication area 11 on the virtual space 10 (reference FIG. 8), and the page fixed flag F is set to the corresponding page fixed flag field within the table 15 so that the communication area 13 is not paged out. In this case, it is assumed that the header address of the virtual communication area 11 is set to a predetermined value and this value is common to all the user processes in all the clusters. It is also assumed that the size of the virtual communication area 11 is the same as the size of the real communication area 13.

The operating system allocates a unique communication area identifier within the cluster to the real communication area 13 and sets the base address (header address) and the size of the real communication area 13 to the entry (reference FIG. 9) of the communication area table 16 having the communication area identifier as an entry number. The virtual communication area 11 is fixedly allocated to the real communication area 13 by the page fixed flag of the page table. Therefore, the virtual communication area 11 can be uniquely identified within the cluster by the unique communication identifier within the cluster that has been set in the real communication area 13.

Then, the operating system secures real request area 14 in the continuous area on the memory 2, sequentially writes the address of the secured real request area 14 in the real page address field of the entry of the page table 15 corresponding to the virtual address of the request area 12 in the virtual space 10, and set the page fixed flag F is the page fixed flag field (reference FIG. 8) so that the secured real request area 14 is not paged out. Then, the operating system creates the request structure unit 12-1 and the location table 12-2 is the virtual request area 12, as shown in FIG. 7. As described above, the corresponding real request area 14 has been secured in the virtual request area 12 and the real request area 14 is set to be resident in the memory 2 so that this area is not paged out. Accordingly, the really memory corresponds to the request structure unit 12-1 and the location table 12-2 without exception. However, no information has been stored in these.

The operating system further sets the address of the page table 15 in a predetermined area (not shown) of the process which is initialized, so that the process can refer to the page table 15.

The operating system then writes the real header address of the area of the real request area 14 corresponding to the above created request structure unit 12-1, in the unused entry of the real request table 17.

By initializing the operating system as described above, an access can be made to the real communication area 13 from the user process by using the virtual address of the virtual communication area 11. Also, an access can be made to the real communication area 13 from the operating system or the external device by using the real address through the real communication area table 16. The real area corresponding to the virtual request structure unit 12-1 can be accessed from the virtual request area 12-1 by using the virtual address of the virtual request area 12-1, and the real area can also be directly accessed from the operating system or the external device by using the real address through the request table 17.

Then, the operating system puts together the name of the process which has been given to the initialized process in advance by the programmer or by the compiler, the communication area identifier of the real communication area 13 to be utilized by this process and the address within the network of the cluster. The operating system transfers this set data to all the other clusters. The operating system in each of the other clusters having received the process name, the communication area identifier and the address within the network of the cluster writes the received name of the process, the received communication area identifier and the received address within the network of the cluster in the spare entry of the location table (the area on the real memory corresponding to the location table 12-2 in FIG. 7) in the real request area 14 provided for the user process in the cluster the reference of the process names of which has been determined in advance by the programmer or by the compiler. The cluster for initializing the above user process performs the same processing as the above when the user process which uses the process within this cluster as the user process of the transmission destination has been initialized in the other cluster. With the above arrangement, when the process to be executed in the virtual space 10 assigns the name of the transmission destination user process, the address of the cluster in which this process exists and the communication area identifier of the communication area 11 to be utilized by the transmission destination user process can be obtained without using the operating system as described later.

User processes which have been operated in the manner as described above operate in parallel by mutually transmitting data to each other.

Figure 11:
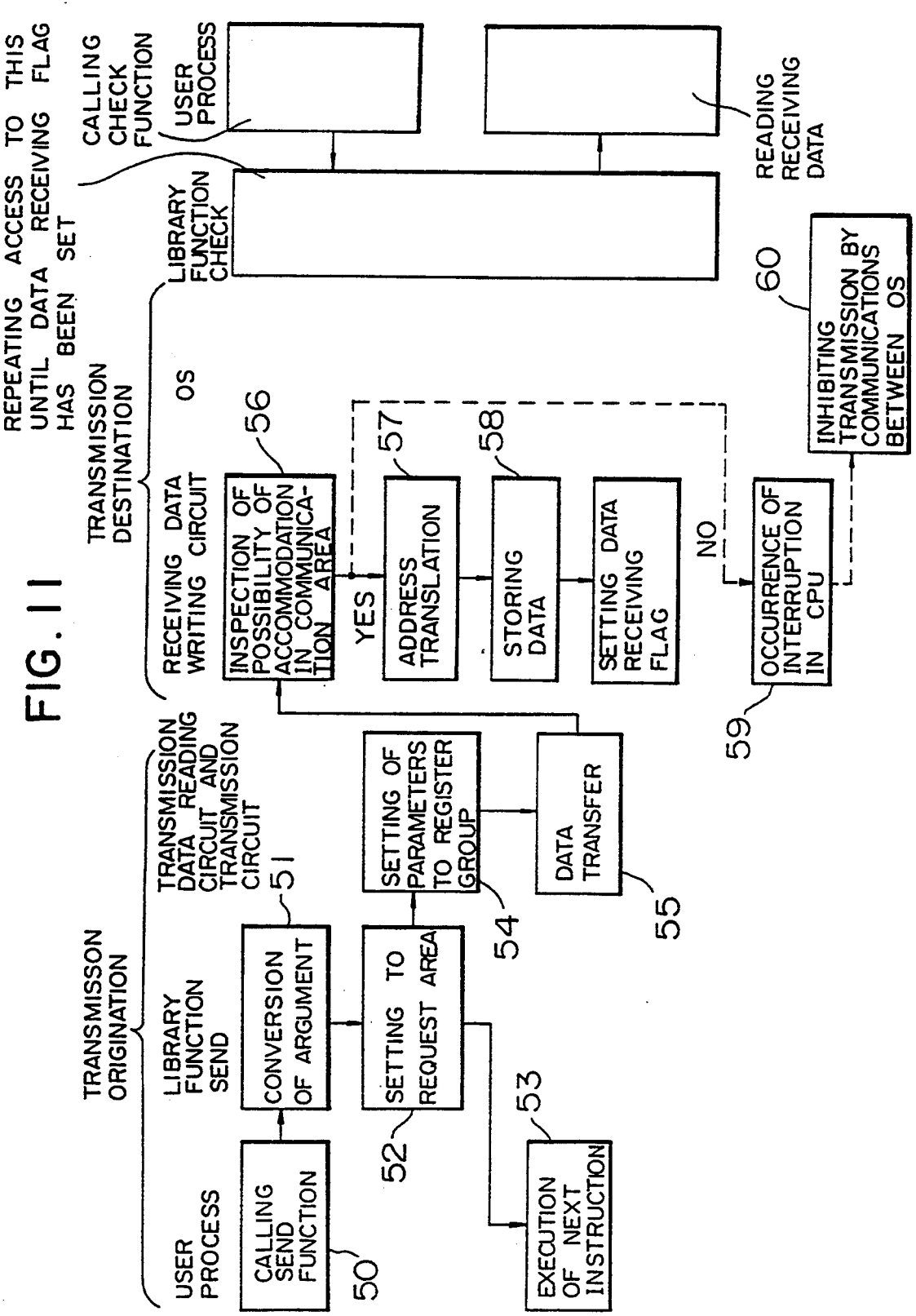
FIG. 11 is a diagram showing a data transfer flow between the processes of a parallel computer relating to the first embodiment of the present invention.

Next, data communications between the processes relating to the present embodiment will be explained with reference to FIG. 11. The procedure for carrying out data communication between user processes will be explained by dividing the operations into the operation of a transmission originating user process and the operation of a transmission destination user process. In the explanation of the operation of the transmission originating user process, explanation will be made by dividing the operation into the operation of the transmission originating user process, the operation of the transmission originating cluster and the operation of the transmission destination cluster (not shown). In the following explanation, unless otherwise indicated, the processings are carried out by the CPU 1.

Step 50: Calling the library function Send

When the transmission originating process is going to transmit transmission data in the virtual communication area 11, for example, the array A, to the transmission destination process, the library function Send prepared in advance (not shown) is called in the following format:

Send ("name of transmission destination process", X, Y, Z, L).

A user identically determines the name of the transmission destination process of a first argument. A second argument X is a virtual address of the header in the virtual space 10 of the transmission originating process of the transmission data A, third argument Y is a virtual address of the header of the area in which the data is to be stored in the virtual space (not shown) of the transmission destination process. A fourth argument Z is a virtual address allocated to the data receiving flag to be stored in the transmission destination cluster when the data has been received. A fifth argument L is the volume of data to be transmitted. In the present embodiment, the transmission originating process knows in advance the position and the size of the virtual communication area of the transmission destination process. Accordingly, the virtual addresses to be assigned by the third and fourth arguments have been programmed to belong to this communication area. Further, the data volume assigned by the fifth argument has been programmed to be smaller than the size of the virtual communication area.

Step 51: Conversion of arguments

The library function Send which has been called operates as follows in the virtual space 10 as a part of the user process. The library function Send reads the cluster address and the communication area identifier of the transmission destination process from the location table 12-2 in the virtual request area 12 (the corresponding real request area 14 is resident in the memory 2), based on the name of the transmission destination process. Then, the library function Send converts the virtual address of the header of the transmission data into the real address of the transmission data in the real communication area 13 on the memory 2 by using the page table 15. The library function Send subtracts the header address of the virtual communication area 11 of the transmission originating cluster from the virtual address of the data receiving area and the data receiving flag respectively, to obtain an offset within the real communication area 13 of the transmission destination respectively. The validity of this operation is guaranteed by the fact that, in all the clusters, the header address of the virtual communication area 11 within the user process has been set to the same and that the virtual communication area 11 has been sequentially allocated from the header of the area in the real communication area 13 of the continuous area on the memory 2.

The offset volume obtained above becomes negative when there is a program error in the user process, and in this case a program interruption occurs in the operating system.

Step 52: Setting in the request area

The library function Send next writes the address CL of the transmission destination cluster and the communication area identifier ID that have been read previously, and the offset SO of the data receiving area, the offset FO of the data receiving flag, the data length of the transmission data and the real address that have been obtained previously, into the request structure unit 12-1 respectively in virtual request area 12 (FIG. 7). Further, the library function Send sets the request flag in the request flag field in the request structure unit 12-1. Since the virtual request area 12 is resident in the real request area 14, these parameters are written in the real request area 14.

Step 53: Execution of the next instruction

When the above processings have been completed, the library function Send returns the control to the user process. The user process executes the following instruction of transmission request, in parallel with the execution of the following operations.

Step 54: Setting parameters to registers

A request selection circuit 21 always repeats the following operations.

Figure 2:
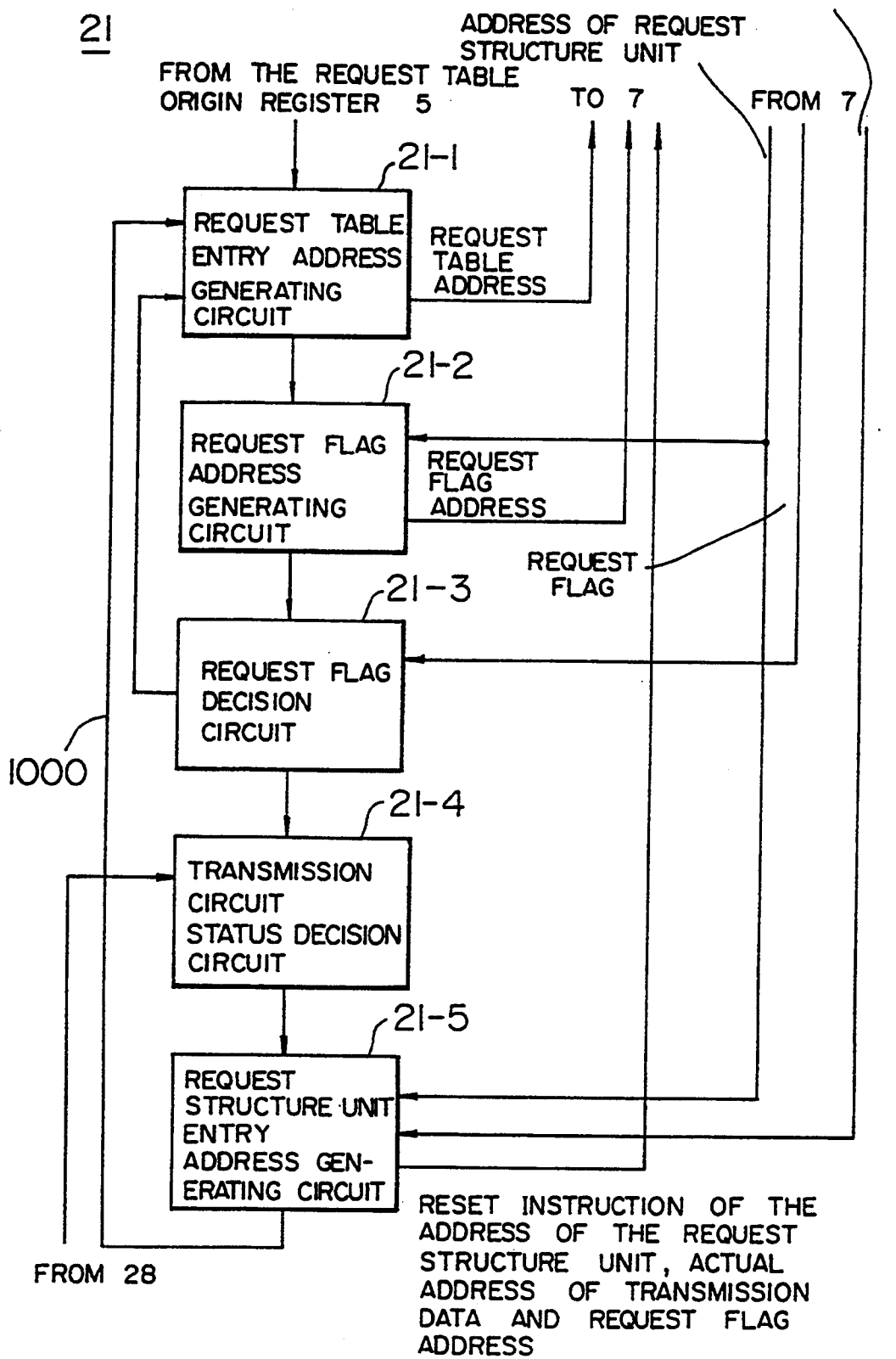
FIG. 2 is a configuration diagram of a request selective circuit.

The request selection circuit 21 reads the value of the request table origin register 5, that is, the value set by the operating system when the operating system has been initialized, in the request table entry address generating circuit 21-1 within the circuit 21 (FIG. 2), generates a real address of the header entry of the request table 17 on the memory 2, and reads the real address of the request structure unit (not shown) which is the contents of this entry from the memory 2 and inputs into the request flag address generating circuit 21-2 through the memory access circuit 7 and the bus 3. The circuit 21-2 obtains the real address of the request flag field from the read real address of the request structure unit, and inputs the contents of this real address from the memory 2 into a request flag decision circuit 21-3 through the memory access circuit 7 and the bus 3. The request flag decision circuit 21-3 decides whether the request flag has been written into the request flag field, and sends a signal to the request table entry address generating circuit 21-1 if the request flag has not been written into the request flag field. This circuit 21-1 generates an address of the next entry of the request table 17, and then a circuit request flag address generating circuit 21-2 and a request flag decision circuit 21-3 operate in the same manner as the above. If the request flag has been written into the request flag field, the request flag decision circuit 21-3 further sends a signal to a transmission circuit state decision circuit 21-4 for the decision circuit 21-4 to decide the state of a transmission circuit 28 of the corresponding cluster. When the transmission circuit 28 is busy, the circuit 21-4 decides the state of the transmission circuit 28 again. When the circuit 28 is not busy, a request structure unit entry address generating circuit 21-5 is initialized. This circuit 21-5 reads the request structure unit (not shown) in the real address area corresponding to the virtual request structure unit 12-1, based on the address of the request structure unit 12-1 which has been read previously by the request table entry address generating circuit 21-1, and makes a copy of the cluster address CL into a register 22, a copy of the communication area identifier ID into a register 23, a copy of the offset SO of the data receiving area into a register 24, a copy of the offset FO of the data receiving flag into a register 25, and a copy of the data length LEN into a register 26. Then, the circuit 21-5 makes a copy of the data to be transmitted, from the real communication area 13 into a buffer 27 by using the real address of the transmission data within the real request structure unit (not shown) that has been read. Then, the circuit 21-5 sends a request flag address and a reset instruction for resetting the request flag field so that the user process which has made the transmission request can recognize that the contents of the area inn which the data to be transmitted is being stored can be altered because the reading of the data to be transmitted has been completed.

When the above processings have been completed, the completion of the processings is noticed to the request table entry address generating circuit 21-1 through a line 1000.

The similar processings are carried out for the rest of the request structure units.

Step 55: Transfer of data

The transmission circuit 28 transmits the contents of the registers 22 to 26 together with the contents of the buffer 27, as a packet, to the network 4.

As described above, in the transmission originating cluster, the library function Send, the transmission data reading circuit 110 and the transmission circuit 28 transmit data to the network 4 without involving the operating system, in response to the request from the transmission originating process. The operation of the transmission destination cluster will be explained next.

Step 56: Inspection of data accommodatability in the communication area

When the packet has arrived at the transmission destination cluster from the network 4, a receiving circuit 42 receives the packet and makes a popy of the communication area identifier (ID) into a register 37, a copy of the offset (SO) of the data receiving area into a register 38, a copy of the offset (FO) of the data receiving flag into a register 39, a copy of the data length (LEN) into a register 40, and a copy of the data into a buffer 41 respectively.

Figure 3:
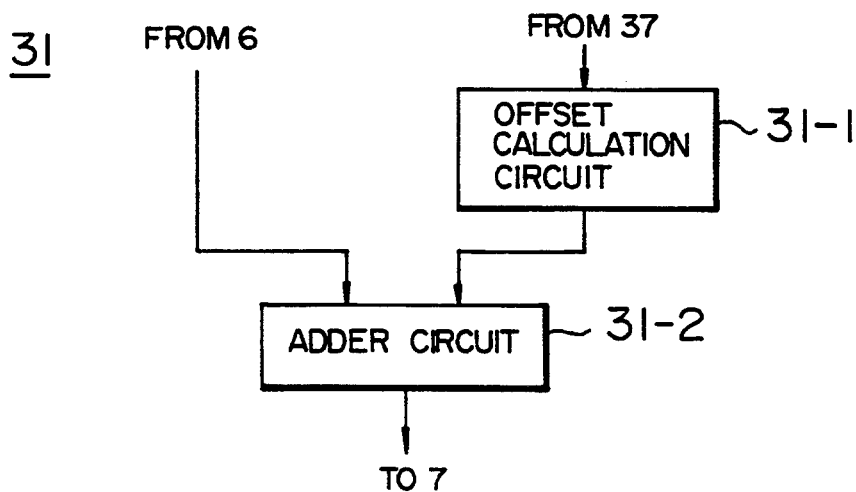
FIG. 3 is a configuration diagram of a communication area table address generating circuit.

Then, based on the communication area identifier ID stored in the register 37, a communication area table address generating circuit 31 (FIG. 3) uses an offset calculating circuit 31-1 to calculate the offset of the entry corresponding to this ID within the communication area table 16 (FIG. 9). The communication area table address generating circuit 31 then uses an adder circuit 31-2 toladd this offset to the header address of the communication area table 16 on the memory 2 indicated by the communication area table origin register 6, to calculate the entry address (real address) corresponding to this communication area identifier of the communication area table 16, and makes a copy of the communication area base address BASE of this entry into the register 32 and a copy of the size LN of the communication area into the register 33 respectively, through the memory access circuit 7 and the bus 3.

Figure 4:
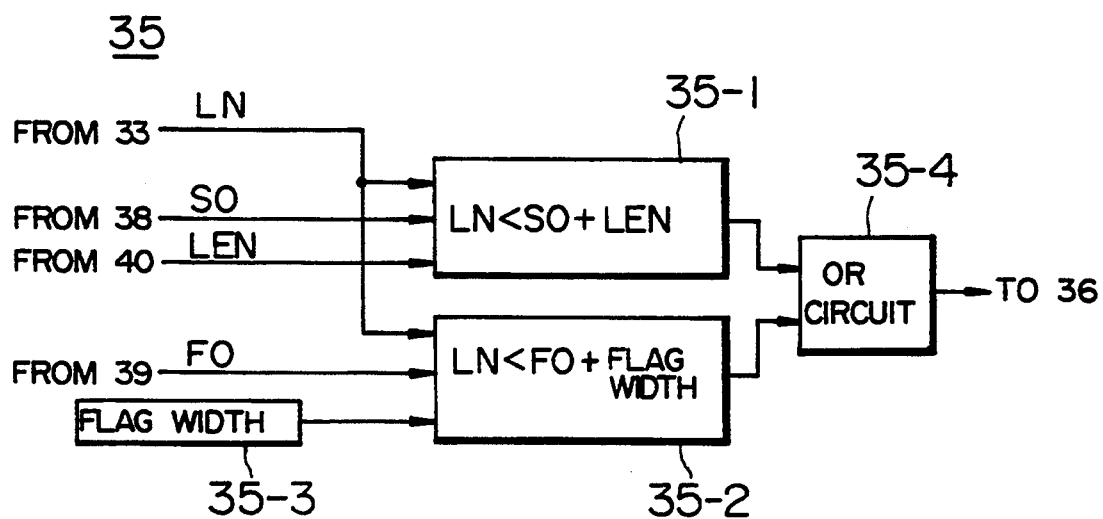
FIG. 4 is a structure diagram of a decision circuit.

When the transmission originating process has been normally programmed, the address for storing the received data and the address for storing the data receiving flag are accommodated in the real communication area 13. In the present embodiment, it is decided whether these addresses can be accommodated in the real communication area 13 in order to detect a program error of the transmission originating process. In other words, a decision circuit 35 (FIG. 4) makes a decision with comparator circuits 35-1 and 35-2, by using the offset SO of the data receiving area which is the contents of the register 38, the offset FO of the data receiving flag which is the contents of the register 39, the data length LEN which is the contents of the register 40 and the size LN of the communication area which is the contents of the register 33. The comparator circuit make a decision respectively based on the inequalities shown in FIG. 4. When the inequalities are met, a write disable signal is produced by these circuits. An OR circuit 35-4 ORs the output signals produced by the comparator circuits 35-1 and 35-2. When the signals are outputted to this OR circuit 35-4, this means that the data can not be accommodated in the communication area 11.

Step 59: Occurrence of an interruption

When the data can not be accommodated in the real communication area 13 as a result of the decision, the decision circuit 35 makes the bus 3 produce a hardware interruption signal.

Step 60: Inhibition of communications

The hardware interruption signal is noticed to at least one CPU of the transmission destination cluster. The operating system is initialized by the interruption processing routine of the CPU 1 which has first recognized the signal, and the subsequent transmission is inhibited by the communication of this operating system with the operating system of the other cluster.

Step 57: Address translation

Figure 5:
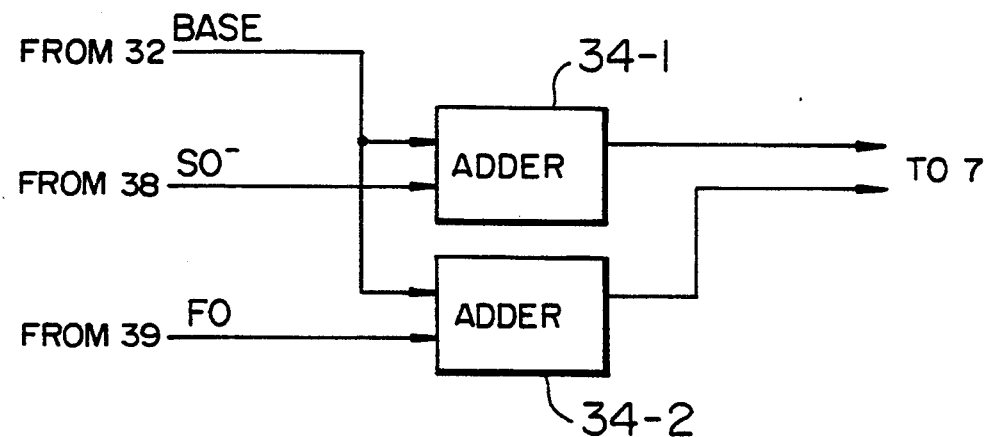
FIG. 5 is a structure diagram of an address generating circuit.

When the transmission data can be accommodated in the real communication area 13, an address generating circuit 34 (FIG. 5) uses an adder circuit 34-1 to generate a real address of the position at which the received data is to be stored, by using the offset SO of the receiving data area which is the contents of the register 38 and the base address BASE of the communication area 13 which is the contents of the register 32. Further, the address generating circuit 34 uses an adder circuit 34-2 to generate a real address of the position at which the data receiving flag is to be stored, by using the offset FO of the data receiving flag which is the contents of the register 39 and the base address BASE of the data receiving flag which is the contents of the register 32.

Step 58: Storing of data

The memory access circuit 7 transfers the received data in the buffer 41 to the real communication area 13 by using the real address of the received data generated in Step 57 and the data length LEN which is the contents of the register 40. The memory access circuit further sets the data receiving flag to the position of the real address of the data receiving flag generated in Step 57.

As described above, the received data can be written into the real communication area without involving the operating system.

In the above operations, the transmission originating process assigns the positions of the receiving data and the data receiving flag by the virtual address of the virtual communication area 11. However, since the virtual communication area 11 is resident in the real communication area 13, the data writing can never be unsuccessful due to a page fault. In other words, the packet is not retransmitted from the transmission originating cluster to the transmission destination cluster. Accordingly, in the present embodiment, it is not necessary to provide an area for storing the copy of the packet in order to be prepared for a retransmission of the packet as has been required according to the prior-art technique.

Operation of the transmission destination process will be explained next.

At the time when the transmission destination process wants to use the data, the process checks using the library function for confirming the arrival of the data and then reads the data receiving flag which exists in the virtual communication area 11 by using the virtual address. Then, based on the value of the data receiving flag, the process decides whether the data receiving has been completed or not. The transmission destination process resets the data receiving flag in advance by the assignment of the programmer or the compiler before the data is transmitted. When the data receiving has been completed, the flag is set as described above. Therefore, the transmission destination process can decide the completion of data receiving based on this flag. After confirming the completion of the data receiving, the transmission destination process makes an access to the received data by using the virtual address. When the flag remains being reset, it is so programmed that the transmission destination process does not make an access to the data within the virtual communication area 11.

Next, ending of the process will be explained. When the process is to be ended, the operating system deletes the page table 15 for the process and releases the resource such as the memory area corresponding to this process, in the manner similar to the operation of the UNIX of the prior-art technique. According to the present embodiment, the entry corresponding to the real communication area 13 allocated to the process to be ended in the communication area table 16, is further deleted. Further, the operating system notices the name of the process to be ended to the operating system of the other cluster through the network. The operating system of the cluster to which the completion of the ending of the process has been noticed deletes the term corresponding to the process name of the ended process from the location table 12-2.

The above completes the explanation of the first embodiment of the present invention.

A modified Example of the Embodiment 1
(Embodiment 2)

In the above embodiment, it has been assumed that the virtual communication area 11 is placed in the same address in each virtual space. However, it may also be assumed such that a fourth field is provided in each entry of the location table 12-2 (FIG. 7), the header virtual address of the virtual communication area 11 in the corresponding process is stored in this fourth field, and the contents of the fourth field are used for the portion in which the offset of the data receiving area is calculated by using the header address of the virtual communication area 11 of the transmission originating process in the above Step 51. By this arrangement, it is not necessary to set the same for the header virtual address of the virtual communication area 11 in each virtual space.

In the above Step 56, the header address and the length of the real communication area 13 are obtained by using the communication area identifier ID which is included in the received packet and is stored in the register 37. However, it may also be good to arrange such that, in stead of the communication area identifier ID, an identifier which can uniquely identify the process for receiving data is used, and a circuit for obtaining the header address and the length of the real communication area 13 from this identifier is prepared within the receiving data write circuit.

Figure 12:
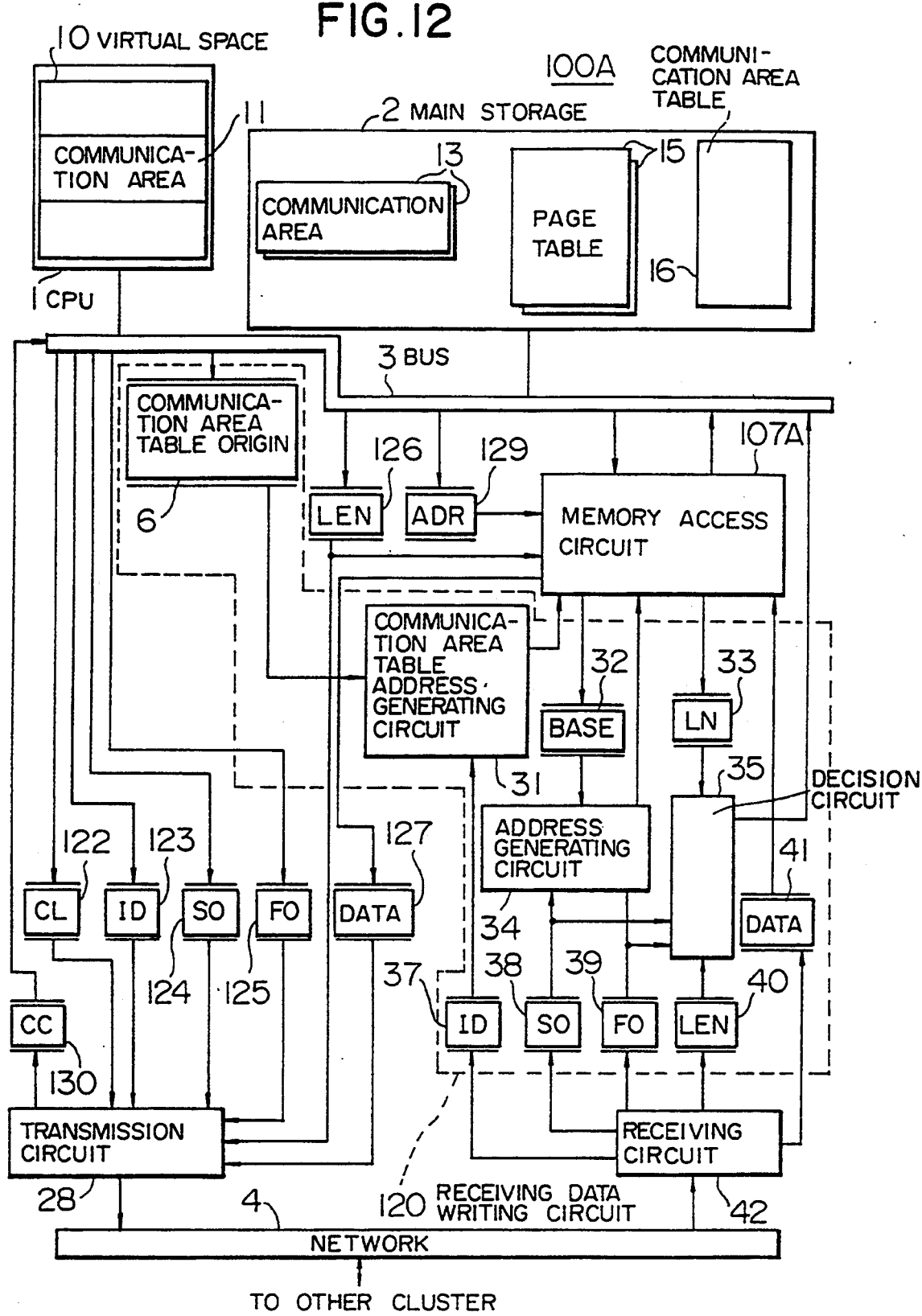
FIG. 12 is a configuration diagram of a parallel computer relating to a second embodiment of the present invention.

A second embodiment of the present invention will be explained with reference to FIG. 12. The second embodiment is a modification of the first embodiment. Therefore, description will be made for mainly different points between the two cases. The present embodiment is different from the first embodiment in that, while the transmission destination process receives data without involving the operating system, only the transmission originating process involves the operating system when transferring data to the network. According, there is an advantage that the number of involvement of operating systems for transmitting and receiving of data is smaller than that of the known prior-art techniques, although the number is larger than that of the first embodiment. FIG. 12 shows the cluster 100B according to the second embodiment. In FIG. 12, the structures of the elements having the same reference numbers as those in FIG. 1 are the same as the elements of the first embodiment.

Unlike the first embodiment, the present embodiment does not include the request table 17, the request areas 12 and 14 and the request table origin register 5 in each of the clusters 100A.

Referring to FIG. 12, 122, 123, 124, 125, 126 and 129 designate registers corresponding to the registers 22, 23, 24, 25, 26 and 29 in FIG. 1 respectively. These registers are directly connected to the bus 3 so that data can be written directly into these registers from the CPU 1 as the main storage 2. 130 designates a register which is connected to the bus 3 and which can directly read data from the CPU 1 as from the main storage 2. The register 122 is for storing the address CL of the transmission destination cluster. The register 123 is for storing the communication area identifier ID of the real communication area 13 allocated to the transmission destination process. The register 124 is for storing the offset so from the header real address of the real communication area 13 of the data receiving area in the real communication area 13 corresponding to the virtual communication area 11 of the transmission destination process, and the register 125 is for similarly storing the offset FO of the data receiving flag. The register 126 is for storing the data length LEN of the transmission data. The register 129 is for storing the header real address ADR of the data transmitted by the transmission originating process. The transmission circuit 28 reflects to the register 130 the state CC which shows whether the circuit 28 is busy or not. 127 designates a buffer for storing data to be transmitted from the main storage 2. 107A designates a memory access circuit for reading a valve stored at a position of the address of the memory from the main storage 2 or for writing this value into the assigned register or the main storage 2, or for writing the valve from the assigned register or the main storage 2 into a separate address of the main storage 2, when the memory address has been given.

Figure 13:
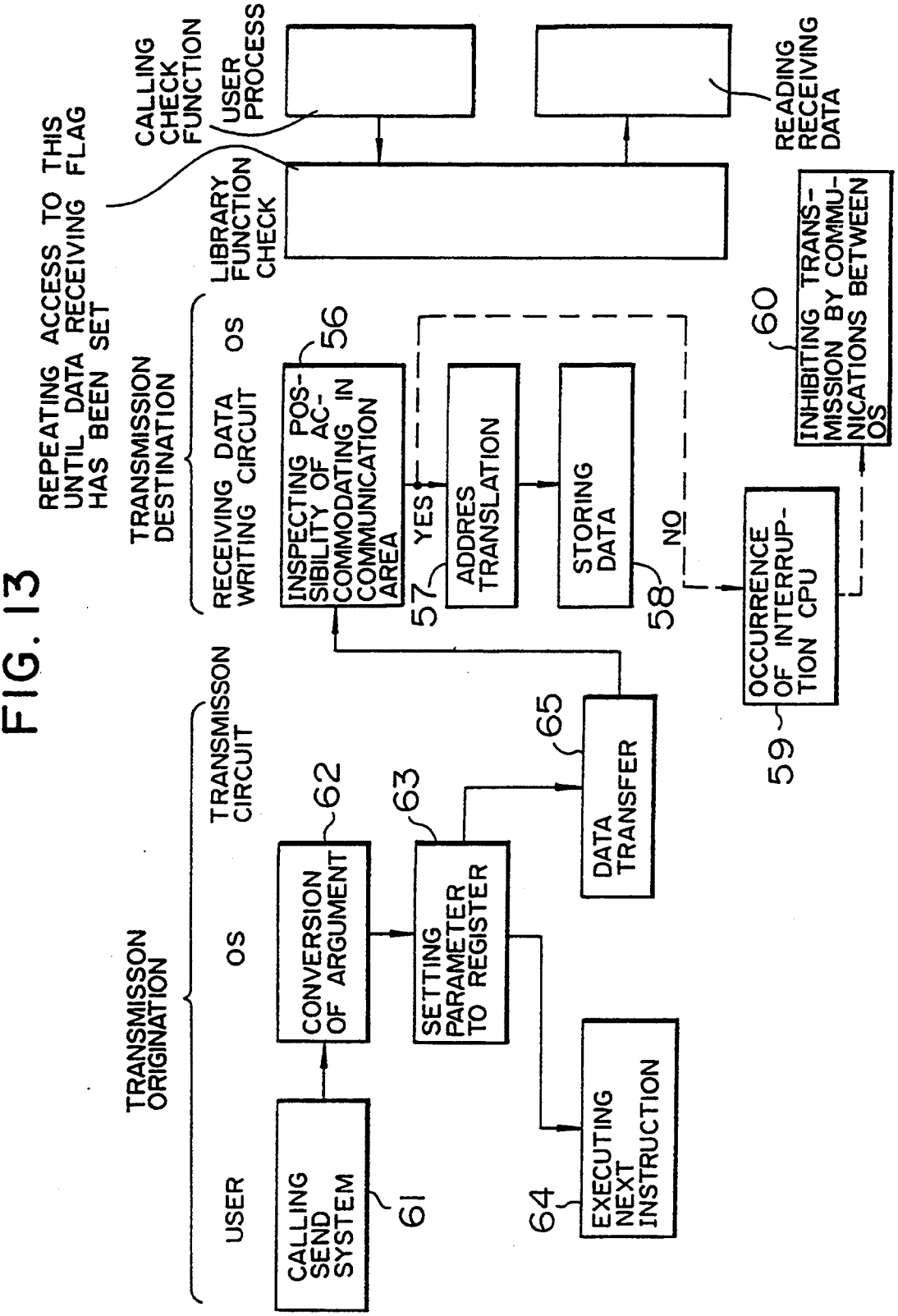
FIG. 13 is a diagram showing a data transfer flow between the processes of the parallel computer relating to the second embodiment of the present invention.

Description will now be made of the portion of the operation of the parallel processor relating to the present embodiment which is different from the first embodiment, with reference to FIG. 13.

Initialization of the parallel computer will be explained. In the present embodiment, no processing is carried out for the request table 17 and the request table origin register 5 of FIG. 1 as these are not used in the present embodiment. The other processings are the same as those in the first embodiment.

Next, process initialization will be explained. In the present embodiment, no processing is carried out for the virtual request area 12 and the real request area 14 as these are not used in the present embodiment. However, a table (not shown) having the same contents as those of the location table 12-2 in the virtual request area 12 in FIG. 1 is prepared inside the operating system. The often processings are the same as those for the first embodiment.

Next, data communications between the processes relating to the present invention will be explained. In the present embodiment, the operation of the transmission originating process is different from that of the first embodiment, with the rest of the operation being the same as in the first embodiment. Therefore, only the different operations will be explained with reference to FIG. 13.

Step 61: Send system call

A user program issues a system call of the operating system and delivers the control to the operating system. This call has the same format as the call statement of the library function in the above first embodiment.

Step 62: Conversion of arguments

When a system call has been issued, the operating system determines the address on the network of the cluster in which the transmission destination process exists and the communication area identifier of the real communication area 13 allocated to the transmission destination process based on the transmission destination process name, by using the contents registered in advance, at the time of the process initialization, in the table (not shown) inside the operating system (corresponding to the location table 12-2 in the first embodiment). The operating system determines the header real address of the transmission data in the real communication area 13 on the main storage 2 based on the header virtual address of the transmission data by using the page table 15. Then, the operating system further obtains the offsets SO and FO from the header address of the virtual communication area 11 within the transmission destination process, from the virtual address of the data receiving area and the virtual address of the data receiving flag, in the same manner as the first embodiment.

Step 63: Setting parameters to registers

The operating system reads the state CC 130 through the bus 3 to confirm that the communication circuit 28 is not busy, and sets the address CL of the transmission destination cluster, the communication area identifier ID of the real communication area 13 allocated to the transmission destination process, the offset SO of the data receiving area, the offset FO of the data receiving flag, the data length LEN of the transmission data and the header real address of the transmission data, to the registers 122, 123, 124, 125, 126 and 129 respectively. The operating system then delivers the control of the execution to the user program.

Step 64: Execution of the next instruction

Upon ending the reading, the operating system returns the control to the user program to execute the next instruction.

Step 65: Data transfer

The transmission circuit 28 constitutes a packet by using the registers 122, 123, 124, 125 and 126 and the data buffer (2), and transmits to the network 4.

The operation when the packet is received from the network 4 is the same as that for the first embodiment, and therefore the explanation of this operation is omitted.

The end of the process will be explained next. In the present embodiment, the request areas 12 and 14 are not used unlike the first embodiment. Therefore, it is not necessary to delete the request areas following the end of the process.

The above covers the operations of the second embodiment.

According to the present embodiment, the transmission originating cluster involves the operating system, so that the overhead becomes slightly larger than that of the first embodiment. However, unlike the known prior-art techniques, a transmission buffer and a receiving buffer need not be provided within the operating system, as is the case with the first embodiment, so that the overhead for data transmission and receiving can be reduced from the known prior-art techniques. Further, the present embodiment can be achieved in a more simple circuit structure than the first embodiment.

Embodiment 3

Figure 14:
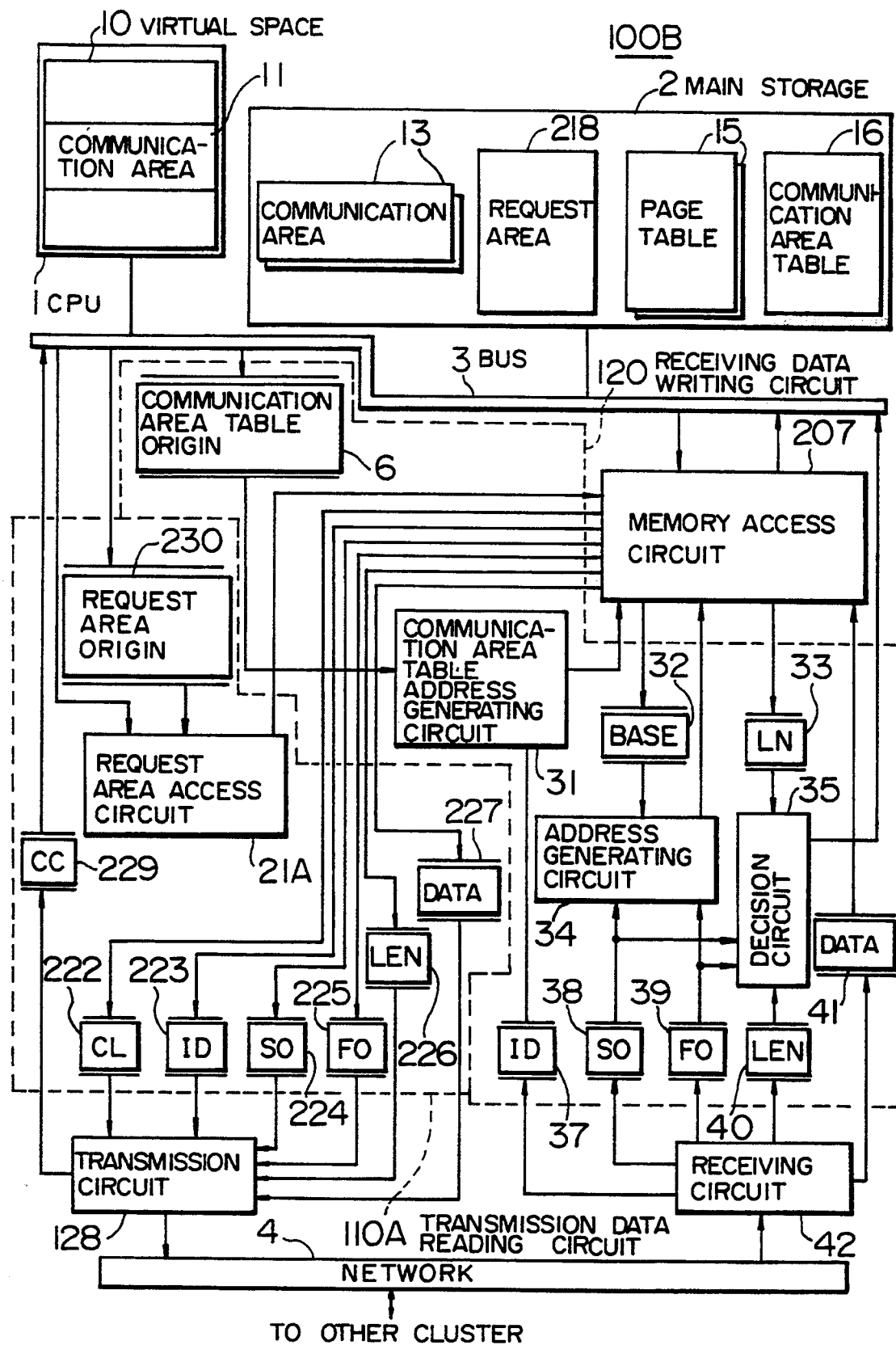
FIG. 14 is a configuration diagram of a parallel computer relating to a third embodiment of the present invention.

A third embodiment of the present invention will be explained with reference to FIG. 14. The third embodiment is a modification of the second embodiment and, therefore, different points will be mainly explained. The present embodiment is the same as the second embodiment in that the transmission originating process transmits data to the network through the operating system and the transmission destination process receives data without involving the operating system. However, the present embodiment is different from the second embodiment in that the operating system places parameters necessary for data transfer on the main storage 2. FIG. 14 shows a cluster 100B according to the present embodiment. In FIG. 14, those elements having the same reference numbers as those in FIGS. 1 and 12 are the same elements having the same structures. Referring to FIG. 14, 218 designates a request area located in the main storage 2, and this request area 218 is managed by the operating system. 230 designates a request area origin register for storing the header address of the request area 218, 222, 223, 224, 225, 226 and 227 designate registers corresponding to the registers 122, 123, 124, 125, 126 and 127 in the second embodiment respectively. The register 222 is for storing the cluster address CL on the network of the transmission destination cluster. The register 223 is for storing the communication area identifier ID of the real communication area 13 allocated to the transmission destination process. The register 224 is for storing the offset so of the data receiving area in the real communication area 13 allocated to the transmission destination process. The register 225 is for similarly storing the offset FO of the data receiving flag. The register 226 is for storing the data length LEN of the transmission data. The register 229 is for setting a value which reflects the state CC of the transmission circuit 128. The register 227 is a data buffer for storing the contents of transmission data to be transmitted to the network. 207 designates a memory access circuit for making an access to the main storage 2 when an address has been delivered, to store a value in a designated register or to write a value of the register in the main storage.

Operation of the parallel processor relating to the present embodiment will be explained next. Only the operation of the present embodiment different from the operation of the second embodiment will be explained.

Initialization of the parallel computer will be explained. In the present embodiment, when the operating system is to be started, the request area 218 is secured on the main storage 2 and the header real address of the request area 218 is set to the request area origin register 230. Other operations are the same as those of the second embodiment.

Figure 15:
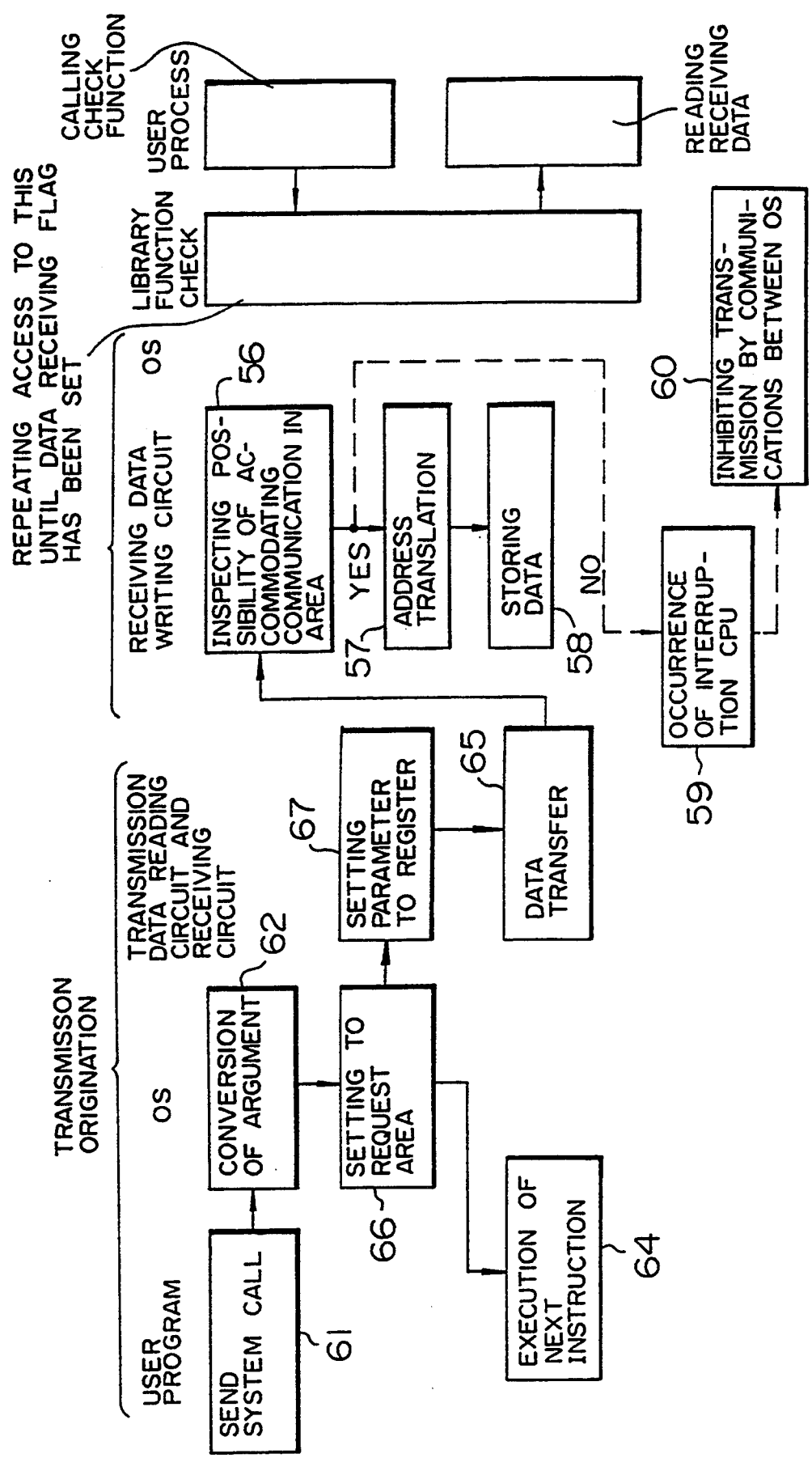
FIG. 15 is a diagram showing a data transfer flow between the processes of the parallel computer relating to the third embodiment of the present invention.

Data communications between the processes relating to the present embodiment will be explained. In the present embodiment, the operation of the transmission originating process is different from the operation of the second embodiment. Therefore, only this difference will be explained with reference to FIG. 15.

Step 61: Send system call

The operation of issuing the system call from the user process is the same as that of the second embodiment.

Step 62: Conversion of arguments

The operation is the same as that of the second embodiment.

Step 66: Setting to the request area

The operating system reads the state CC 229 through the bus to confirm that the communication circuit 28 is not busy, and sets in the request area 218 on the memory 2, the address CL of the transmission destination cluster, the communication area identifier ID of the real communication area 13 allocated to the transmission destination process, the offset so of the data receiving area, the offset FO of the data receiving flag, the data length of the transmission data and the header real address of the transmission data. The memory access circuit 207 is started based on this set. It is also possible to provide a semaphore in the request area 218 and start the memory access circuit 207 through the semaphore. The operating system then delivers the control of the execution to the user program to execute the next instruction (64 in FIG. 15).

Step 67: Setting parameters to registers

The operating system instructs reading of the request area 218 to the request area access circuit 21A through the bus 3. The circuit 21A generates each entry of the request area 218 from the request area origin register 230, reads the contents of each entry through the memory access circuit 207, and sets the address CL of the transmission destination cluster, the communication area identifier ID of the real communication area 13 allocated to the transmission destination process, the offset SO of the data receiving area, the offset FO of the data receiving flag and the data length LEN of the transmission data to the registers 222, 223, 224, 225 and 226 respectively. The memory access circuit 207 copies the transmission data to the data buffer 227 from the main storage 2 based on the header real address of the transmission data.

Step 65: Data transfer

After the above registers have been set, the transmission circuit 128 structures a packet by using the registers 222, 223, 224, 225 and 226 and the buffer 227, and transmits the packet to the network.

The operation when the packet is received from the network 4 is the same as the operation of the second embodiment, and therefore, the explanation of this operation will be omitted.

The above covers the operations of the third embodiment.

According to the present embodiment, it is possible to obtain performance equivalent to that of the first embodiment in a circuit structure more simple than that of the first embodiment, in the manner similar to that of the second embodiment.

Embodiment 4

A fourth embodiment of the present invention will be explained next. The fourth embodiment is a modification of the third embodiment. The configuration of the cluster of the fourth embodiment is the same as the configuration of the third embodiment, and therefore, explanation will be made with reference to FIG. 14. How to use the request area 218 is different from how to use the request area origin register 230. Accordingly, this difference will be mainly explained.

First, system initialization will be explained. In the present embodiment, the request area 218 is not fixed on the main storage 2, unlike the third embodiment. Therefore, the request area 218 is not secured when the system is initialized but as secured at the time of data transmission. No value is set to the request area origin register 230 at the time of system initialization.

Figure 16:
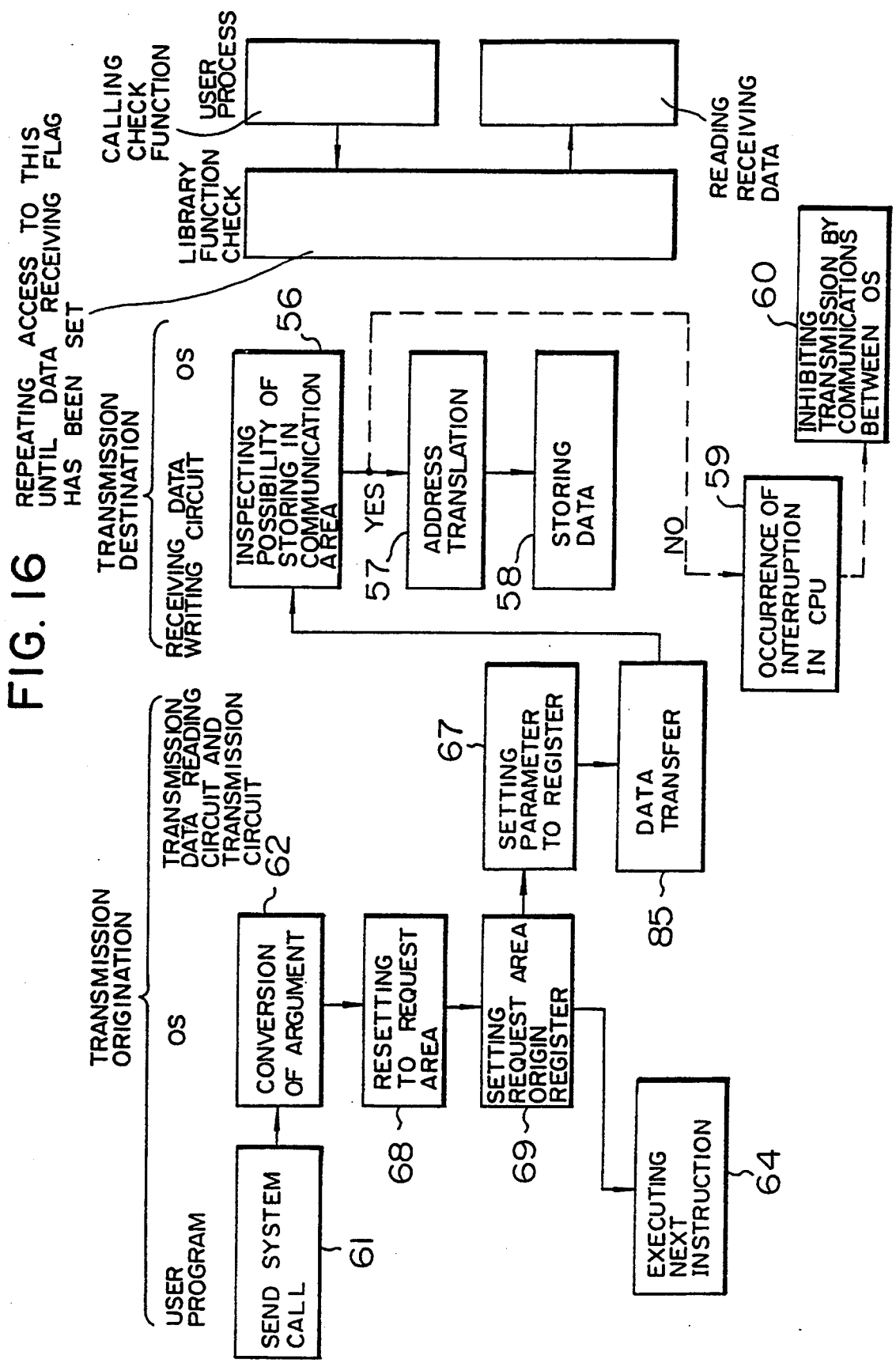
FIG. 16 is a diagram showing a data transfer flow between the processes of a parallel computer relating to a fourth embodiment of the present invention.

Operation of the operating system of the transmission originating process will be explained with reference to FIG. 16.

Step 61: Send system call

The operation is the same as that of the third embodiment.

Step 62: Conversion of arguments

The operation is the same as that of the third embodiment.

Step 68: Setting to the request area

The operating system secures the request area 218 on the memory 2 and unites in the request area 218 the address CL of the transmission destination cluster, the communication area identifier ID of the real communication area 13 allocated to the transmission destination process, the offset SO of the data receiving area, the offset FO of the data receiving flag, the data length LEN of the transmission data and the header real address of the transmission data.

Step 69: Setting the request area origin register

The operating system reads the state CC 229 to confirm that the transmission circuit 128 is not busy, and sets the header address of the request area 218 to the request area origin register 230, so that the memory access circuit 207 and the transmission circuit 128 are initialized. The operating system delivers the control of the execution to the user program to execute the next instruction (64 in FIG. 16).

Step 67: Setting parameters to registers

The operation is the same as that of the third embodiment.

Step 65: Data transfer

The operation is the same as that of the third embodiment.

The operation when the packet is received from the network 4 is the same as the operation of the third embodiment, and therefore, this will not be explained.

The above covers the operation of the fourth embodiment.

In the present embodiment, the request area 218 may be secured each time when data transmission is carried out. Accordingly, when it is so controlled that each CPU1 included in the cluster secures the request area 218 in a different address of the main storage 2, it becomes possible to simultaneously parallel execute the Step 61, the Step 62 and the Step 68 in each CPU1. With the above arrangement, in parallel with the operation of the transmission circuit 128 started by the Step 69 executed by a certain CPU 1, other CPU 1 can execute the Steps 61, 62 and 68, and others CPU1 can execute the Step 69 immediately often ending the operation of the transmission circuit 128. As a result, according to the present embodiment, the number of overhead of the operating system involved in data transmission can be further reduced from that of the third embodiment.

Embodiment 5

Figure 17:
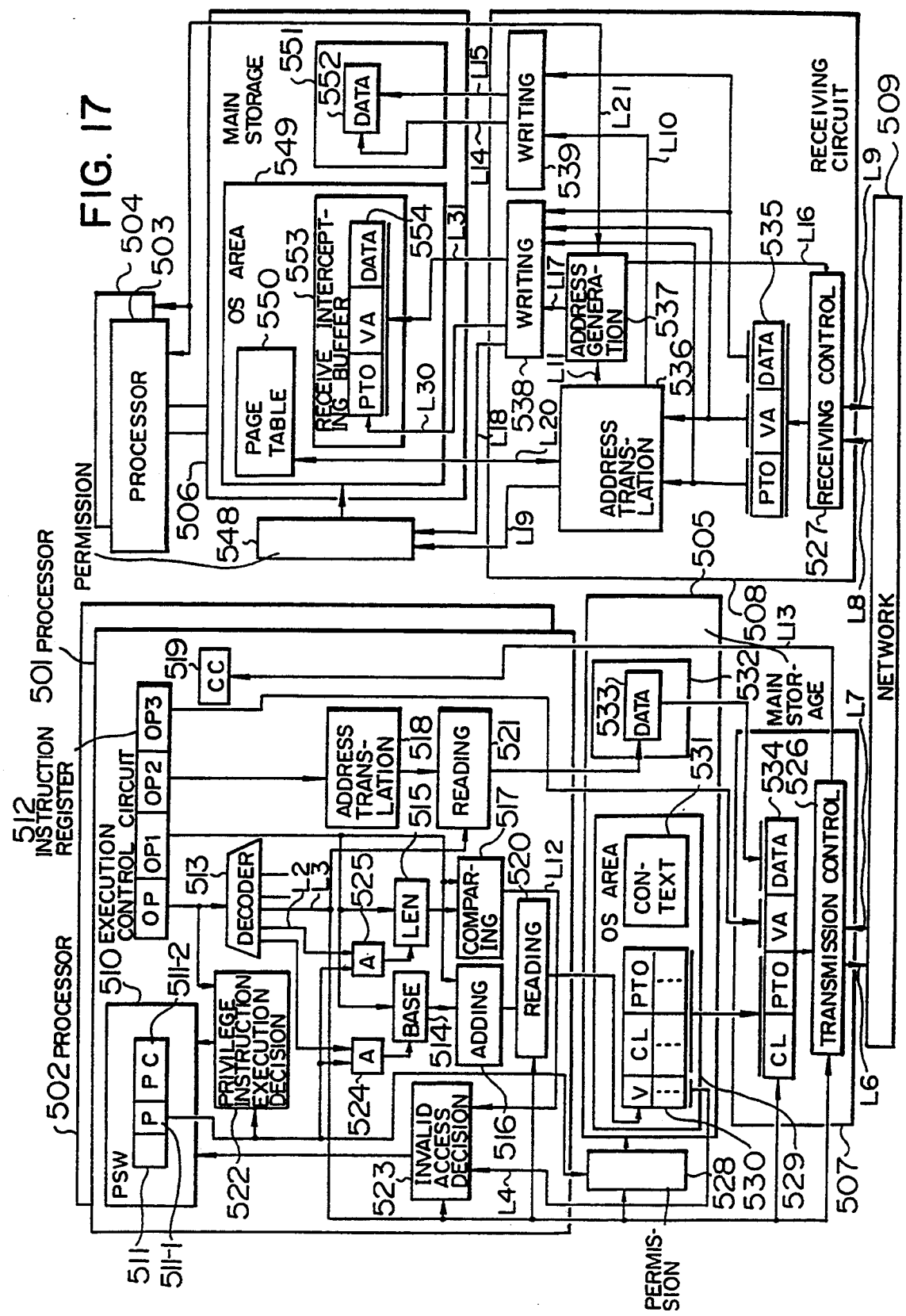
FIG. 17 is a configuration diagram of a parallel processor relating to a fifth embodiment of the present invention.

FIG. 17 shows a configuration of the parallel processor relating to a fifth embodiment of the present invention. In FIG. 17, 501, 502, 503, and 504 designate processors which have all the same configurations. 505 designates a main storage shared by the processors 501 and 502 and 506 designates a main storage shared by the processors 503 and 504. The processors 501 and 502 and the main storage 505 form a first cluster and the processors 503 and 504 and the main storage 506 form a second cluster. 507 designates a transmission circuit connected to the first cluster. 508 designates a receiving circuit connected to the second cluster. The first cluster has a receiving circuit similar to the receiving circuit 508 of the second cluster. However, the receiving circuit of the first cluster is not shown in FIG. 17 to simplify the drawing. Similarly, the second cluster has a transmission circuit similar to the transmitting circuit of the first cluster, and this transmission circuit is not shown to simplify the drawing. 509 designates a network for connecting between the first cluster and the second cluster. The network 509 transfers a message from the transmission circuit 507 of the cluster to a designated destination.

In the present embodiment, two processors are used to form a cluster and two clusters are used to simplify the drawing. However, the technique relating to the present invention may also use three or more processors to form a cluster, and may also use three or more clusters.

Configuration of the processors 501 to 504 will be explained. Except for having a new instruction to be described later, the processors 501 to 504 may have the same configuration as the microprocessor according to the prior-art technique, for example, the microprocessor H32 of Hitachi Ltd. In FIG. 17., an internal configuration is shown for only the processor 501 is simplify the drawing. In FIG. 17, 510 designates an execution control circuit for controlling the instruction execution sequence of the processor 501. 511 designates a PSW (program status word). 511-1 designates a privilege status display field having a one-bit width located in the PSW 511. When the display field 511-1 is 1, the processor 501 is in a privileged status and when the display field 511-1 is 0, the processor 501 is in a non-privileged status. 511-2 designates a PC (program counter) for storing on address of an instruction under execution. 512 designates an instruction register for storing an instruction under execution. 513 designates an instruction decoder. 514 designates a PATH table base register for storing a memory address of a PATH table to be described later. 515 designates a PATH table length register. 516 designates an adder and 517 designates a comparator, 518 designates an address translation circuit for translating a virtual address assigned by an instruction into a real address. The address translation circuit 518 can be easily structured by the prior-art technique. 519 designates a condition code registers for storing a value defined by an instruction specification based on a result of executing an instruction. 520 and 521 are circuits for reading the main storage 505. 522 designates a privileged instruction execution decision circuit and 523 designates an invalid access decision circuit. 524 and 525 designate AND circuits.

Figure 18:
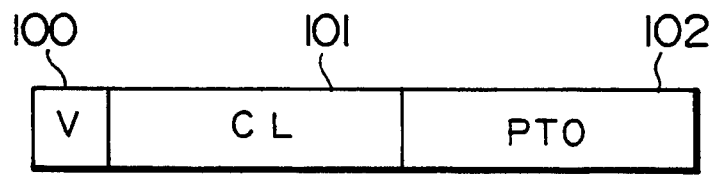
FIG. 18 is a diagram showing an entry of a PATH table, to be used in the parallel processor in FIG. 17, for translating a path of a virtual communication path into a physical communication path.

The main storage 505 includes the following. 528 designates an access permitting circuit for an area of an operating system. 529 designates an operating system area. In order to make an access to the operating system area 529, it is necessary to input a signal to the operating system area access permitting circuit 28. It is possible to make an access to other areas without inputting a signal to the operating system area access permitting circuit. 530 designates a PATH table to be described later. The entry of the PATH table 30 has a format shown in FIG. 18. 531 designates a context of a process under execution in the processor 501. 502 designates a virtual space corresponding to a process under execution by the processor 501. FIG. 17 shows only a virtual space corresponding to the process under execution by the processor 501, to simplify the drawing. However, other virtual spaces may also be used in the present invention. A virtual space can be easily structured by the prior-art technique. 533 designates data to be transferred in the virtual space.

The transmission circuit 507 has a function for transmitting data to the network 509 based on the instruction from the processor 501 or the processor 502. 534 designates a transmission register for storing a message to be transmitted to the network, 526 designates a transmission control circuit for transmitting the contents of the transmission register 534 to the network 509 through a line L6 so long as a transmission interruption signal has not been inputted from the network 509 through a line L7.

The receiving circuit 508 is structured by the following elements. 535 designates a receiving register for storing a message arriving from the network 509, through a line L18 and a receive control circuit 527. 536 designates on address translation circuit for deciding whether a real address can be obtained from a PTO (page table origin) and a VA (virtual address) included in a receiving register 535, and for outputting the real address obtained to a line L10 when the real address has been obtained. The address translation circuit 536 outputs a signal to a line L11 if the real address can not be obtained. 537 designates an address generating circuit. 538 and 539 designate write circuits for writing data into the main storage 506.

The main storage 506 includes the following. 548 designates an operating system area access permitting circuit. 549 designates an operating system area. In order to make an access to the operating system area 549, as in the case of making an access to the main storage 505, it is necessary to input a signal to the operating system area access permitting circuit 548. 550 designates a page table. 551 designates a virtual space into which data is to be written in the data transfer explained in the present embodiment. 552 designates a data storage area in the virtual space 551, 553 designates a receiving intercepting buffer 554 designates a data storage area in the receiving intercepting buffer 553.

Operation of the parallel processor relating to the present invention will be explained. In the parallel processor relating to the present invention, the first cluster and the second cluster are tightly coupled multiprocessors which execute initial program loading, after the power source has been turned on, in the same manner as the tightly coupled multiprocessor according to the prior-art technique, so that the operating system in each cluster is initialized independently. In this case, operating system areas 529 and 549 are secured in the main storages 505 and 506 respectively. Units necessary for the initialization, such as, for example, magnetic disk units, are omitted in the drawing for simplicity.

When an instruction for initializing a user program has been inputted to a certain cluster after the operating system was initialized, the operating system of this cluster generates a virtual space and then generates therein a process necessary for the execution of the user program. User processes which have been generated in the manner described above sequentially generate processes necessary for executing the user programs in the own cluster and other clusters. A group of user processes generated directly or indirectly by one instruction of initialization are called jobs. A job identification mark is given to each job by the operating system. Each user process is given a name by the user so that each user process is unique among the jobs. When a process of a duplicated name is to be generated within jobs due to a user program error or the like, the operating system detects this duplication and abnormally ends the corresponding job. A plurality of processes may be generated in one cluster when user processes are generated. The method for generating user processes may be similar to the method of the prior-art technique, for example, the method used in the distributed processing system connected by a local area network. Processors which have been generated by the above method execute calculations indicated by the program by mutually transmitting data.

As described above, the processors 501 to 504 can have a configuration having an instruction execution circuit relating to the present invention added to the microprocessor which can be structured by the prior-art technique. Accordingly, among a series of instructions of the process to be executed by each processor, instructions which can be executed inside the corresponding processor, such as, for example, an arithmetic instruction, are processed in the same manner as done by the microprocessor according to the prior-art technique.

Each processor having the configuration of the parallel processor relating to the present invention has an address translation circuit similar to the microprocessor according to the prior-art technique and supports the virtual space. Each process uniquely corresponds to one virtual space and executes a program in the virtual space. Accordingly, in each cluster, assigning a virtual space is equivalent to assigning a process.

Figure 19:
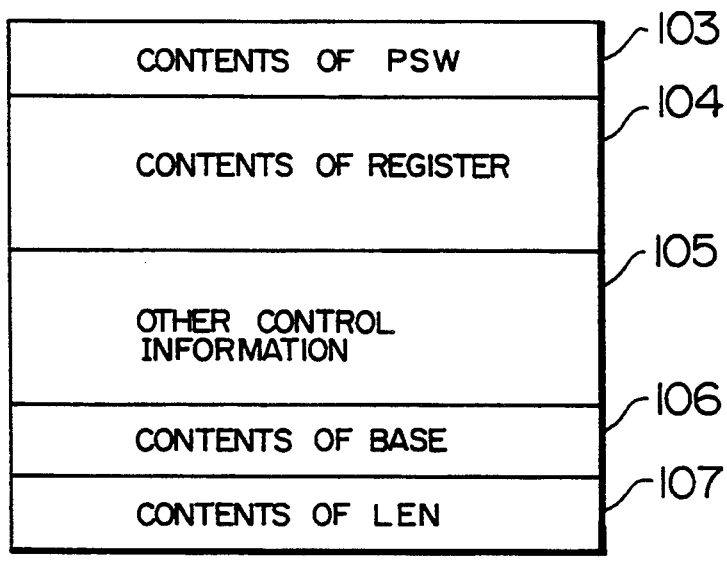
FIG. 19 is a diagram showing a context of a process to be executed by the parallel processor in FIG. 17.

Operation of process generation will be explained with reference to FIG. 17 next. In the parallel processor relating to the present invention, when generating a user process, the operating system generates a PATH table corresponding to the process to be generated, on the real storage in the operating system area 529. (Since the operating system is executed in the privileged status, a value 1 of the privileged status display field 511-1 is being inputted as a signal to the operating system area access permitting circuit 528, so that the operating system can generate the PATH table in the operating system area 529. When the operating system is in the non-privileged status, it is not possible to rewrite the PATH table located inside the operating system area 529). In FIG. 17, a PATH table 530 corresponding to the user process to be executed in the virtual space 532 is generated in the first cluster. In this case, the V field of the whole entry of the PATH table 530 is initialized to 1. The PATH table is managed by BASE which is the header address and LEN which is the length of the PATH table. Both BASE and LEN are handled as a part of the context of the process. FIG. 19 shows the contents of the context of the process. Referring to FIG. 19, contents of the PSW are being stored in a field 103, contents of the register are being stored in a field 104, and other control information is being stored in a field 105. These contents are the same as those of the context managed by the operating system according to the prior-art technique. In the context, 106 and 107 designate fields for storing the above BASE and LEN, which are newly introduced by the present invention.

In the case of scheduling a process corresponding to the virtual space 532 into the processor 501, the operating system of the first cluster stores the contents of the context 531 in the register in the processor 501. According to the parallel processor relating to the present invention, the PATH table base register 514 and the PATH table length register 515 are provided in the processor 501 as exclusive registers for storing the newly introduced BASE and LEN respectively as parts of the context. Further, the parallel processor has a BASE setting instruction and a LEN setting instruction as instructions for storing a value in these registers. Both instructions are privileged instructions, and when these instructions are to be executed in a non-privileged status, an interruption occurs in the processor 501. When a process under execution by the processor 501 has been process switched for some reason and the processor 501 is to be released, a value of the register of the processor 501 is stored in the context 531, contrary to the above.

Figure 20:
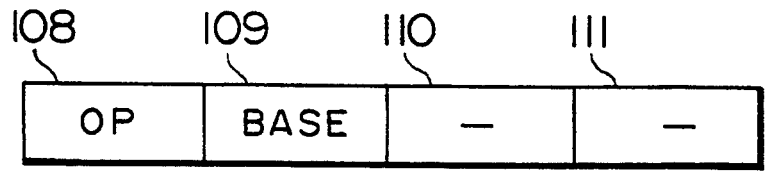
FIG. 20 is a diagram showing a format of a BASE setting instruction to be used in the parallel processor in FIG. 17.

The outline of the instruction execution in the processor 501 will be explained next. First, an instruction is read from the main storage 505 based on the field 511-2 of the PSW 511 in the execution control circuit 510, and the instruction is stored in the instruction register 512. The operation code stored in the field OP of the instruction register 512 is inputted to the privileged instruction execution decision circuit 522. The privileged status display field 511-1 is also being inputted to the privileged instruction execution decision circuit 522. This circuit 522 outputs a signal to the execution control circuit 510 only when the inputted operation code shows a privileged instruction and when the privileged status display field 511-1 shows the non-privileged status. By the above arrangement, an interruption occurs in the processor 501. In other cases, an instruction is executed when an instruction decoder 513 decodes the operation code and generates a signal necessary for the operation of the decoded instruction. FIG. 20 shows the format of the BASE setting instruction. In FIG. 20, 108 stores an operation code of this instruction, and a first operand 109 stores a value to be set to the PATH table base register 514. Values stored in 110 and 111 are not used. In the processor 501, the present instruction is executed in the following sequence.

First, the instruction decoder 513 decodes the instruction as described above, and outputs a signal to the line L1 when the read instruction is the BASE setting instruction. Since the instruction is a privileged instruction, this is not executed when the privileged status display field 511-1 is not 1. When the display field 511-1 is 1, a signal is outputted from an AND circuit 524. With this signal, a value stored in the OP1 field of the instruction register 512 is set to the PATH table base register 514.

Figure 21:
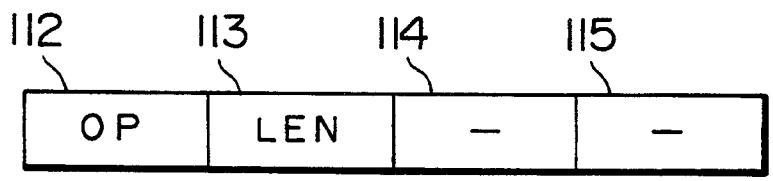
FIG. 21 is a diagram showing a format of a LEN setting instruction to be used in the parallel processor in FIG. 17.

FIG. 21 shows a format of the LEN setting instruction. In FIG. 21, 112 stores an operation code of the instruction and a first operand 113 stores a value to be set to the PATH table base register 514. Values stored in 114 and 115 are not used. In the processor 501, the instruction is executed in the following sequence.

First, the instruction decoder 513 decodes the instruction as described above, and outputs a signal to the line L2 when the read instruction is the BASE setting instruction. Since the instruction is a privileged instruction, this instruction is not executed when the display field 511-1 is not 1. When the display field 511-1 is 1, a signal is outputted from an AND circuit 525. With this signal, a value stored in the OP1 field of the instruction register 512 is set to the PATH table length register 515.

A process having a context loaded in the register by the execution of the BASE setting instruction and the LEN setting instruction and having been scheduled in the processor 501 sets a PATH for data transfer prior to the data transfer to other process within the same job.

First, the process executes a system call for setting the PATH. Specification of this system call is as follows.

path=openpath (name);
name: name of the other process (unique within the job)
path: value of the PATH returned by the operating system The PATH is set in the following sequence.

First, an enquiry is made whether there is a process having an assigned name, to the operating system of the cluster having a process which belongs to the same job as the one of the process that has executed the system call. The operating system of the cluster in which the process of the assigned name exists notices to the enquiring cluster a number of the cluster and a page table origin for structuring the virtual space uniquely corresponding to the assigned process. In other cases, the operating system notices to the enquiring cluster that there is no process of the assigned name.

As a result, when a process having the assigned name has not been found, the system call returns a special value for showing that the process has not been found, to the user process.

When a cluster having the assigned name has been found, an entry having 1 in V field is optionally selected out of the PATH table 530 corresponding to the user process which has executed the corresponding system call, and 0 is written in this V field, a number of the cluster in which the detected process exists is written in the CL field and a page table origin of the virtual space corresponding to the detected process is written in the PTO field. Then, the number of the corresponding entry is returned to the user process. In other words, the number of the entry of the PATH table 530 becomes the value of the PATH.

Figure 22:
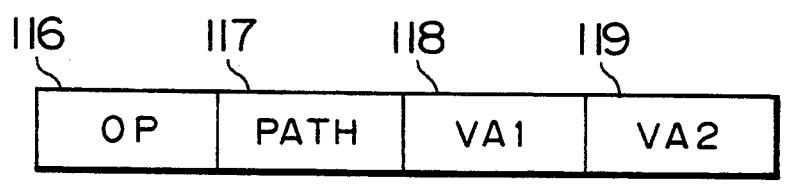
FIG. 22 is a diagram showing a format of a remote store instruction to be used in the parallel processor in FIG. 17.

When the above preparation has been complete, the process can transfer data to other process. Next, specification of a remote store instruction for transferring data will be explained. The remote store instruction is a non-privileged instruction and has a format as shown in FIG. 22. In FIG. 22, 117, 118 and 119 designate virtual addresses within a virtual space corresponding to the other process. 116 is the operation code, 117 is the virtual address for storing a value of the PATH for transmission, 118 is the virtual address for storing the virtual address of the data to be transmitted, in the virtual space of the process for executing the instruction, and 119 is the virtual address for storing the data to be transmitted. The instruction is executed in the following manner. The outline of the operation of the instruction is shown in FIG. 23.

Figure 23:
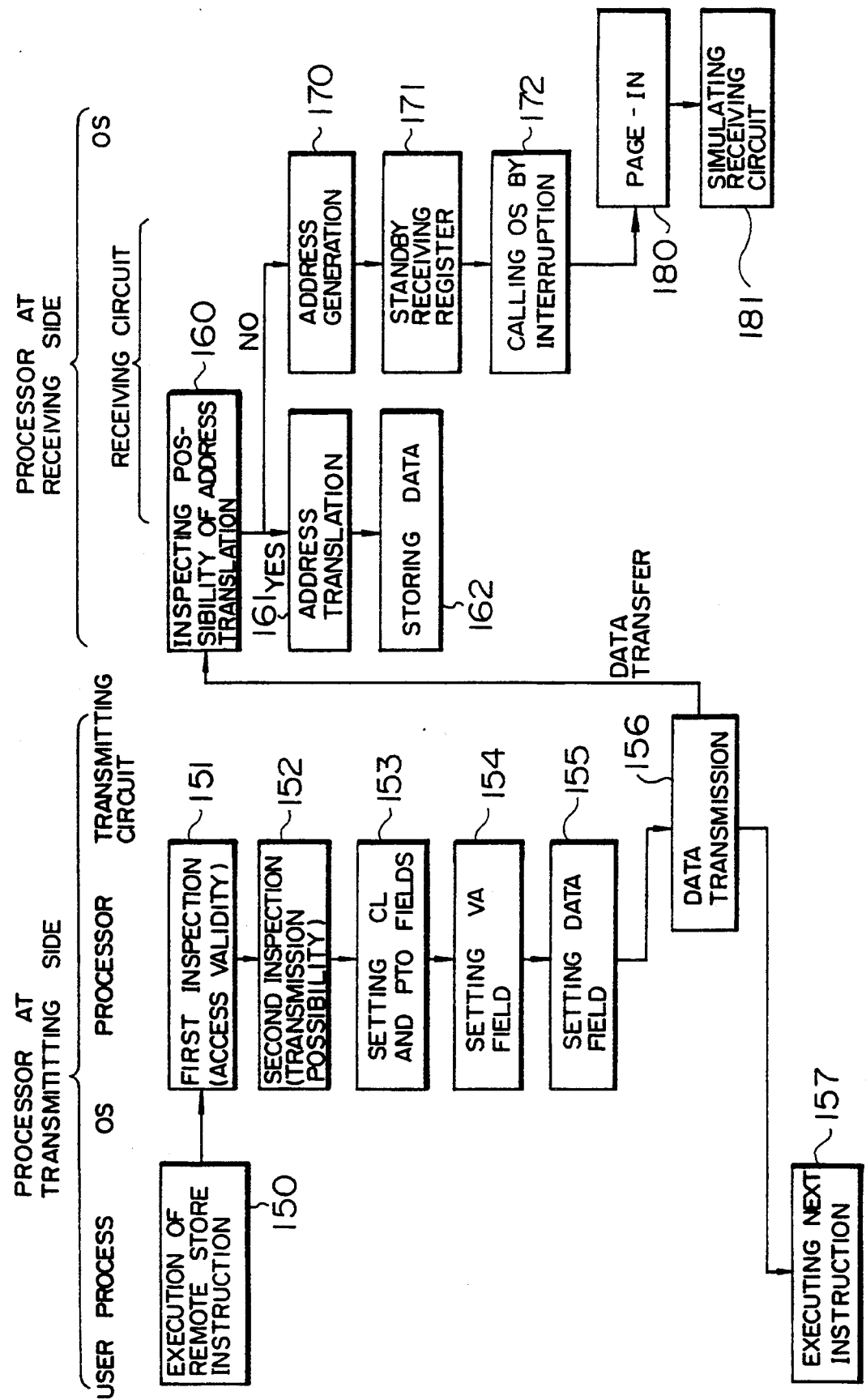
FIG. 23 is a diagram showing the operation of a unit when a data transfer instruction to be used in the parallel processor in FIG. 17 has been executed.

* Execution of the remote store instruction by the user process (150 in FIG. 23)

The user process reads the instruction from the main storage 505 according to the field 511-2 of the PSW 511 in the execution control circuit 510, and stores the instruction in the instruction register 512. Since the instruction is a non-privileged instruction, the privileged instruction execution decision circuit 522 does not output a signal. The instruction decoder 513 decodes the operation code stored in the field OP of the instruction register 512, and produces an output signal to the line L3 when the read instruction has turned out to be a remote store instruction. Then, the following series of operations are started.

* First inspection (151 in FIG. 23)

The processor adds a value of the PATH stored in the first operand (117 in FIG. 22) and a value stored in the PATH table base register 514 with the adder 516, to obtain the entry address corresponding to the PATH in the PATH table 530, and produces an output to the read circuit 520. The read circuit 520 receives the signal from the line L3, refers to the main storage 505 based on the entry address outputted by the adder 516, and produces a signal to the line L4 when the value of the V field of the corresponding entry is 1. (In this case, the reference to the main storage is an access to the operating system area 529. Since a signal is to be inputted to the operating system area permitting circuit 528 from the line L3, the read circuit 520 can read even in non-privileged status.)

The processor compares the value of the PATH stored in the first operand with the contents of the PATH table length register 515 by the comparator 517. As a result of the comparison, when the value of the PATH is larger than the contents of the PATH table length register 515, the processor produces an output signal to the line L12.

The invalid access decision circuit 523 decides whether the value of the PATH assigned by the instruction is a valid data transmission or not, based on the signals of the lines L3, L4 and L12, and produces an output signal to the execution control circuit 510 when the value of the PATH is invalid. The invalid case means the case where a signal has been outputted to at least one of the lines L4 and L12 as a result of executing the instruction.

The above covers the first inspection. When a signal has been received from the invalid access decision circuit 523 as a result of the first inspection, the execution control circuit 510 inhibits the execution of the instruction and interrupts the process 501.

* Second inspection (152 in FIG. 23)

The processor checks the state of the transmission control circuit 526 based on the signal from the line L3.

When it becomes clear as a result of the second inspection that the value set to the transmission register 534 by the remote store instruction previously executed has not yet been completely transmitted to the network 509, the processor sets the condition code 1 to the condition code register 519 by the line L13 and ends the execution of the instruction. The processor carries out the following operation when the value set to the transmission register 534 by the remote store instruction previously executed has been completely transmitted to the network 509.

* Setting of CL and PTO fields (153 in FIG. 23)

In the same manner as the first inspection, the read circuit 520 refers to the memory 505 by the entry address outputted by the adder 516 and outputs the contents of the CL field and the PTO field of the corresponding entry to the line L5. The transmission register 534 sets the value outputted to the line L5 to the CL field and the PTO field based on the signal of the line L3.

* Setting of VA field (154 in FIG. 23)

Next, the processor sets the virtual address stored in the third operand (119 in FIG. 22) directly to the VA field of the transmission register 534 based on the signal of the line L3.

* Setting of data field (155 in FIG. 23)

Then, the address translation circuit 518 translates the virtual address stored in the second operand (118 in FIG. 22) into the real address and produces an output to the read circuit 521. The read circuit 521 reads the memory 505 to the real address based on the signal of the line L3 and outputs the data to be transmitted, to the data field of the transmission register 534. The transmission register 534 sets the data to be transmitted, to the data field based on the signal of the line L3.

* Data transmission (156 in FIG. 23)

When the data has been set to the transmission register 534 in the manner as described above, the condition code O is set to the condition code register 519 by the line L13, thus ending the execution of the instruction. The transmission control circuit 526 which has received the signal of the line L3 starts transmitting the contents of the transmission register 534 to the network 509.

The operation of the remote store instruction ends with the above and the processor 501 executes the next instruction. (157 in FIG. 23)

Whether the data has been successfully transmitted to the network 509 or not can be checked by the conditional branch instruction for reflecting the value of the condition code. When it becomes clear by the value of the condition code that the data has not been successfully transmitted, the instruction may be executed again.

The network 509 transmits a message to the receiving circuit, for example, the receiving circuit 508, of the cluster which has been instructed in the message. As a result, the PTO field, the VA field and the data field of the transmission register 534 are set to the PTO field, the VA field and the data field of the receiving register 535 respectively through the receiving control circuit 527.

* Inspection of address translation possibility (160 in FIG. 23)

When the message has arrived, the receiving circuit 508 transmits the contents of the PTO field and the VA field of the receiving register 535 to the address translation circuit 536. Upon receiving the contents of the PTO field and the VA field, the address translation circuit 536 outputs a signal to the operating system area access permitting circuit 548 through the line L19 based on the page table origin stored in the PTO field and the virtual address (the contents of the VA field) of the corresponding virtual space 551, makes it possible to refer to the operating system area. Thus, the address translation circuit 536 refers to the page table 550 through the line L20 and checks if the real address of the main storage 506 can be obtained or not.

* Address translation (161 in FIG. 23)

When the real memory area corresponding to the virtual address exists and the address translation is possible, the reference to the operating system area is made possible in the manner as described above, and the receiving circuit refers to the page table 550 located in the operating system area 549 and corresponding to the virtual space 551 corresponding to the PTO field of the receiving register 535, through the line L20. Thus, the receiving circuit carries out address translation to obtain the real address from the virtual address in the VA field of the receiving register 535, and outputs the real address obtained as a result of the address translation and a write request signal, to the like L10.

* Data writing (162 in FIG. 23)

The write circuit 539 which has received the above output produces an output of the address inputted from the line L10 to the line L14 and produces an output of the contents of the data field of the receiving register 535 to the line L15, so that the write circuit 539 writes the contents of the data field of the register 535 in the data storage area 552 of the virtual space 551, thus ending the operation.

* Address generation (170 in FIG. 23)

When the above address translation is not possible or when the real address can to be obtained by the page-out, the address translation circuit 536 outputs a signal to the line L11. By the above arrangement, the address generating circuit 537 can generate an address of the area, located inside the receiving intercepting buffer 553, which can store the contents of the receiving register 535.

The receiving intercepting buffer 553 has been secured in advance inside the operating system area 549 of the main storage 506 by the operating system of the corresponding cluster.

* Standby of receiving register (171 in FIG. 23)

When the address generated by the address generating circuit 537 has been transmitted to the write circuit 538 through the line L17, the write circuit 538 outputs a signal to the operating system area access permitting circuit 548 through the line L18, to enable to writing in the operating system area 549. Then the write circuit 538 outputs the address to the main storage through the line L30 and writes the contents of each field of the receiving register 535 through the line L31.

* Calling the operating system by interruption (172 in FIG. 23)

The address generating circuit 537 generates an interruption to any one of the processors 503 and 504 through the line L21.

* Page-in processing (180 in FIG. 23)

The processor in which the interruption has occurred allocates the real address area to the virtual address which has become the cause of the interruption, by a page-in processing.

* Simulation of the receiving circuit (181 in FIG. 23)

The operating system takes out the message from the receiving intercepting buffer 553 and simulates the processing of data processing which is to be executed by the receiving circuit 508 in principle.

Data transmission is completed as described above.

When the address can not be generated because of no room available in the receiving intercepting buffer 553 in the above address generation (170 in FIG. 23), the address generating circuit 537 transmits a signal to the receiving control circuit 527 through the line L16. The receiving control circuit 527 which has received the signal transmits a signal of receiving interception to the network 509 through the line L9, to intercept the transmission of the message from the network 509 through the line L8. The address generating circuit 537 generates an interruption to the processor 503 or the processor 504 through the line L21, to call the operating system and request for the expansion of the receiving intercepting buffer 553. When the expansion has been completed, the operating system notices the completion of the expansion to the address generating circuit 537 through the line L21. The address generating circuit 537 which has received this notice instructs restarting of the receiving to the receiving control circuit 527 through the line L16. Upon receiving the instruction, the receiving control circuit 527 notices the restarting of the receiving to the network 509 through the line L9.

When the necessary data transmission has been all completed, the process executes the system call for releasing the PATH. Specification for this system call is as follows.

closepath (path);
path: value of PATH

In order to release the PATH, 1 is set to the V field of the entry assigned by the argument path in the PATH table 530 corresponding to the process which has executed the system call.

Embodiment 6

Figure 24:
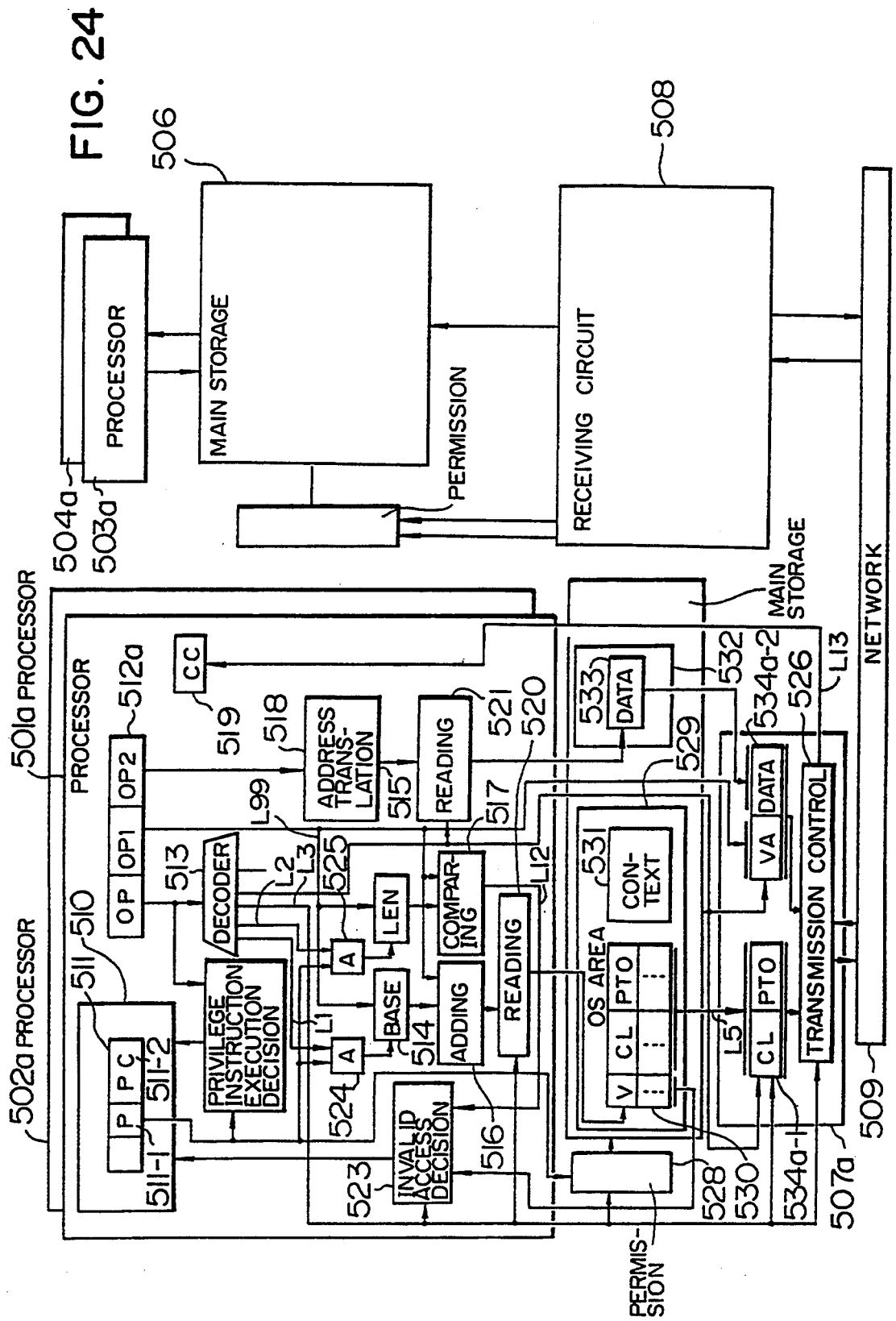
FIG. 24 is a configuration diagram of a parallel processor relating to a sixth embodiment of the present invention.

A sixth embodiment is a modification of the fifth embodiment, and therefore, different points will be mainly explained. FIG. 24 shows a configuration of the parallel processor relating to the sixth embodiment of the present invention. In FIG. 24, those elements having the same reference numbers as those in the fifth embodiment show the same elements having the same configurations.

Referring to FIG. 24, 501a, 502a, 503a and 504a designate processors having the same configurations. 505 and 506 designate main storages. 507a and 508 designate a transmission circuit and a receiving circuit respectively. 509 designates a network.

In the processor 501a, 512a designates an instruction register. The instruction register 512a is different from the instruction register 512 of the fifth embodiment in that the former stores three operands while the latter stores two operands. Other configuration elements of the processor 501a are located in the processor 501 of FIG. 17 and are the same as the configuration elements of the same reference numbers.

In the transmission circuit 507a, 534a-1 and 534a-2 designate transmission registers, which are the transmission register 534 of the fifth embodiment divided into the two as shown in the drawing.

In the present embodiment, the remote store instruction of the fifth embodiment is deleted, and two instructions of a remote store preparation instruction and a remote store execution instruction are newly added. These two new instructions are all non-privileged instructions.

Figure 25:
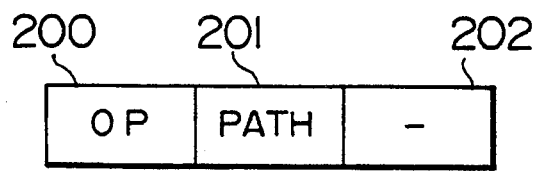
FIG. 25 is a diagram showing a format of a remote store preparation instruction to be used in the parallel processor in FIG. 24.

FIG. 25 shows a format of the remote store preparation instruction. In FIG. 25, 200 designates an operation code of this instruction, and a first operand 201 is a value of the PATH. A value stored in 202 is not used.

Figure 26:
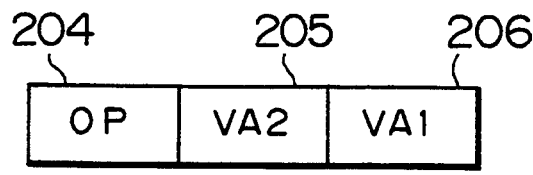
FIG. 26 is a diagram showing a format of a remote store execution instruction to be used in the parallel processor in FIG. 24.

FIG. 26 shows a format of the remote store execution instruction. In FIG. 26, 204 designates an operation code for this instruction, and a first operand 205 is a virtual address within the virtual space corresponding to the other process for storing data to be transmitted. A third operand 206 is a virtual address of the data to be transmitted located in the virtual space corresponding to the process which executes this instruction.

Operation of the parallel processor relating to the present embodiment will be explained next. The operation of the parallel processor relating to the present embodiment is the same as the operation of the fifth embodiment, except that the operation of the remote store instruction deleted from the fifth embodiment is carried out by the two additional instructions of the remote store preparation instruction and the remote store execution instruction. Therefore, the operation of these two instruction will be explained with reference to FIG. 24 and FIG. 27.

The operation of the remote store preparation instruction will be explained first. This instruction is carried out as follows.

Figure 27:
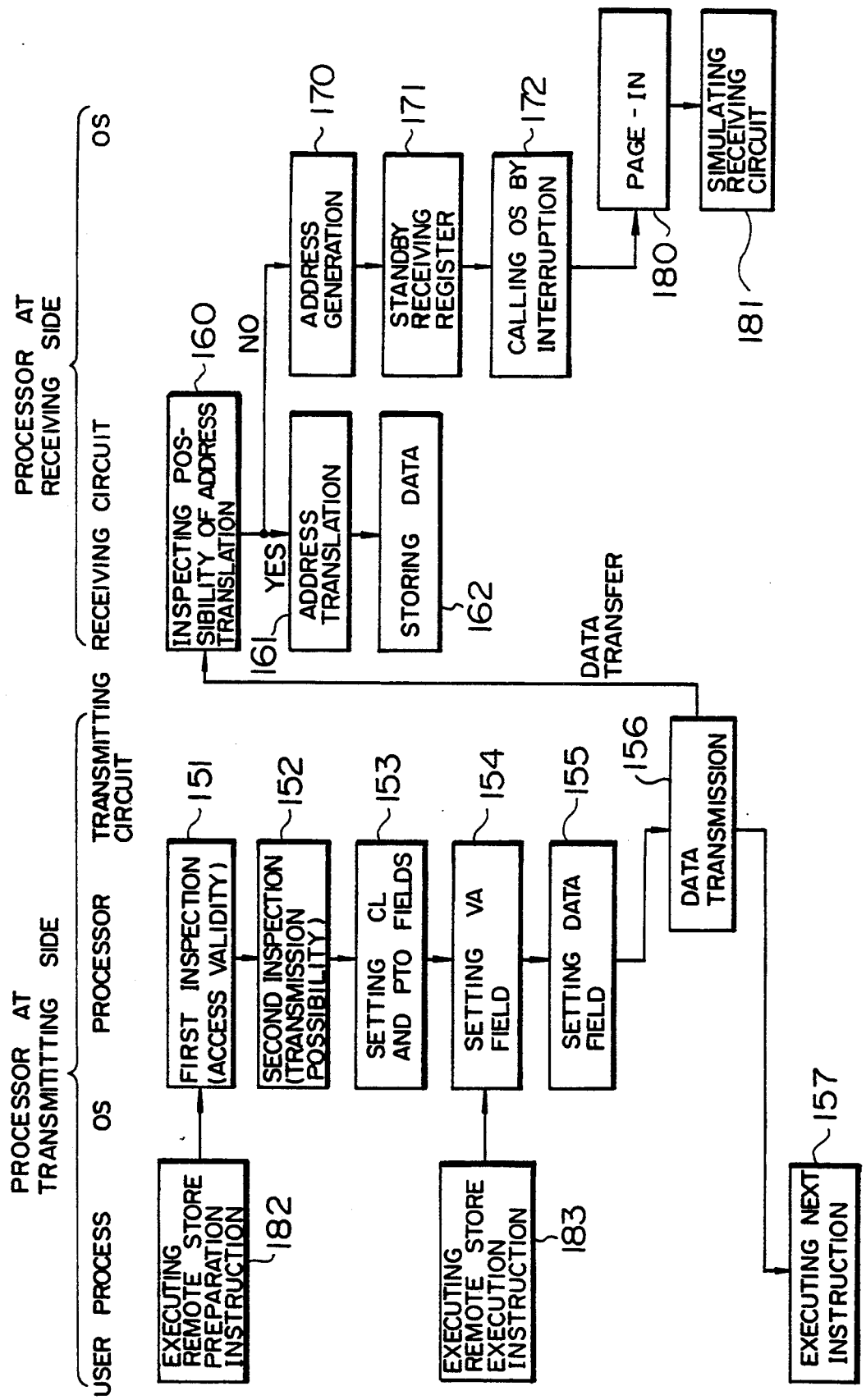
FIG. 27 is a diagram showing an operation of a data transfer instruction to be used in the parallel processor in FIG. 24.

* Execution of the remote store preparation instruction by the user process (182 in FIG. 27)

First, the user process reads the instruction from the main storage 505 according to the field 511-2 of the PSW 511 located in the execution control circuit 510, and stores the instruction in the instruction register 512a. Since this instruction is a non-privileged instruction, the privileged instruction execution decision circuit 522 does not produce an output signal. The instruction decoder 513 decodes the operation code stored in the field OP of the instruction register 512a, and produces an output signal to the line L3 when it becomes clear that the instruction which has been read is the remote store preparation instruction. Then, the following series of operations are carried out.

* First inspection (151 in FIG. 27)

The processor adds the value of the PATH stored in the first operand (201 in FIG. 25) and the value stored in the PATE table base register 514 by the adder 516, to obtain the area address corresponding to the PATH in the PATH table 530, and produces an output to the read circuit 520. Upon receiving the signal through the line L3, the read circuit 520 refers to the main storage 505 by the entry address outputted by the adder 516, and produces an output signal to the line L4 when the value of the V field of the entry is 1. (In this case, the memory reference is an access to the operating system area 529. However, since a signal is inputted to the operating system area permitting circuit 528 from the line L3, the read circuit 520 can read even if it is not in the privileged state). A signal is outputted to the line L4 when the value of the V field of the entry is 1.

The processor further compares the value of the PATH stored in the first operand with the contents of the PATH table length register 515 by the comparator 517. When the value of the PATH is larger than the contents of the PATH table length register 515 as a result of the comparison, the processor produces an output signal to the line L12.

The invalid access decision circuit 523 decides whether the value of the PATH assigned by this instruction is a valid data transmission or not, based on the signals of the lines L3, L4 and L12, and produces an output signal to the execution control circuit 510 when the value of the PATE has been decided to be invalid. The invalid case means the case where an output signal has been produced to at least one of the lines L14 and L12 after executing the instruction.

The above completes the first inspection. When a signal has been received from the invalid access decision circuit 523 as a result of the first inspection, the execution control circuit 510 inhibits the execution of this instruction and produces an interruption to the processor 501a.

* Second inspection (152 in FIG. 27)

The processor checks the state of the transmission control circuit 526 based on the signal from the line L3.

When it has become clear as a result of the second inspection that the values set to the transmission registers 534a-1 and 534a-2 by the remote store execution instruction previously executed have not yet been completely transmitted to the network 509, the processor sets the condition code 1 to the condition code register 519 by the line L13 and ends the execution of the instruction. The processor carries out the following operations when the values set to the transmission registers 534a-1 and 534a-2 previously executed by the remote store execution instruction have all been transmitted to the network 509.

* Setting of the CL and PTO fields (153 in FIG. 27)

First, in the same manner as the case of the first inspection, the read circuit 520 refers to the main storage 505 by the entry address outputted by the adder 516 and outputs the contents of the CL field and the PTO field of the entry to the line L5. The transmission register 534a-1 sets the value outputted to the line L5 to the CL field and the PTO field based on the signal of the line L3.

The above covers the operation of the remote store preparation instruction.

Next, the operation of the remote store execution instruction will be explained. This instruction is carried out as follows.

* Execution of the remote store execution instruction by the user process (183 in FIG. 27)

The user process first reads the instruction from the main storage 505 following the field 511-2 of the PSW 511 in the execution control circuit 510, and stores the instruction in the instruction register 512a. Since this instruction is a non-privileged instruction, the privileged instruction execution decision circuit 522 does not produce an output signal. The instruction decoder 513 decodes the operation code stored in the field OP of the instruction register 512a, and starts the following series of operations after producing an output signal to the line L99 when it has become clear that the instruction that has been read out is the remote store execution instruction.

* Setting of the VA field (154 in FIG. 27)

Next, the virtual address stored in the first operand (205 in FIG. 26) is directly set to the VA field of the transmission register 534a-2 based on the signal of the line L99.

* Setting of the data field (155 in FIG. 27)

The address translation circuit 518 translates the virtual address stored in the second operand (206 in FIG. 26) into the real address and produces an output to the read circuit 521. The read circuit 521 reads the main storage 505 by the real address based on the signal of the line L99 and outputs the data to be transmitted, to the data field of the transmission register 534a-2. The transmission register 534a-2 sets the data to be transmitted, to the data field based on the signal of the line L99.

* Data transmission (156 in FIG. 27)

When the setting to the transmission registers 534a-1 and 534a-2 has been completed as described above, the transmission circuit sets the condition code 0 to the condition code register 519 through the line L13, and ends the execution of this instruction. The transmission control circuit 526 which has received the signal of the line L99 starts the transmission of the contents of the transmission registers 534a-1 and 534a-2 to the network 509.

The above completes the operation of the remote store execution instruction.

As is clear from the above explanation, by executing the remote store preparation instruction to set the value to the transmission register 534a-1 and then executing the remote store execution instruction, it is possible to obtain the effect which is the same as the one when the remote store instruction in the fifth embodiment has been executed. Accordingly, the operation of the processor for receiving the data is exactly the same as the case of the fifth embodiment.

The above completes the explanation of the sixth embodiment of the present invention.

According to the present embodiment, when data is to be transmitted to the same process repeatedly, the remote store preparation instruction is executed only once and the remote store execution instruction is executed by the required number although the remote store instruction is repeatedly executed according to the fifth embodiment. Since the remote store instruction of the fifth embodiment can be replaced by the remote store execution instruction of which processing is much more simple, there is an effect that the overhead necessary for data transmission can be further reduced.

Embodiment 7

A seventh embodiment is a modification of the fifth embodiment, and this can be implemented in a more simple configuration when a constraint is applied to the method of utilizing the fifth embodiment.

A new constraint to be added to the fifth embodiment to achieve the seventh embodiment will be explained below. According to the fifth embodiment, the virtual page in the virtual space of the process for receiving data to be transmitted by the remote store instruction may be paged out by the operating system. However, in the present embodiment, a new constraint is added that the virtual page in the virtual space of the process for receiving data to be transmitted by the remote store instruction is being allocated to the real storage without exception.

The arrangement that the virtual page has been allocated to the real storage without exception and page-out is not allowed is a processing of the so-called page-fix processing. This can be easily achieved by the prior-art technique.

Figure 28:
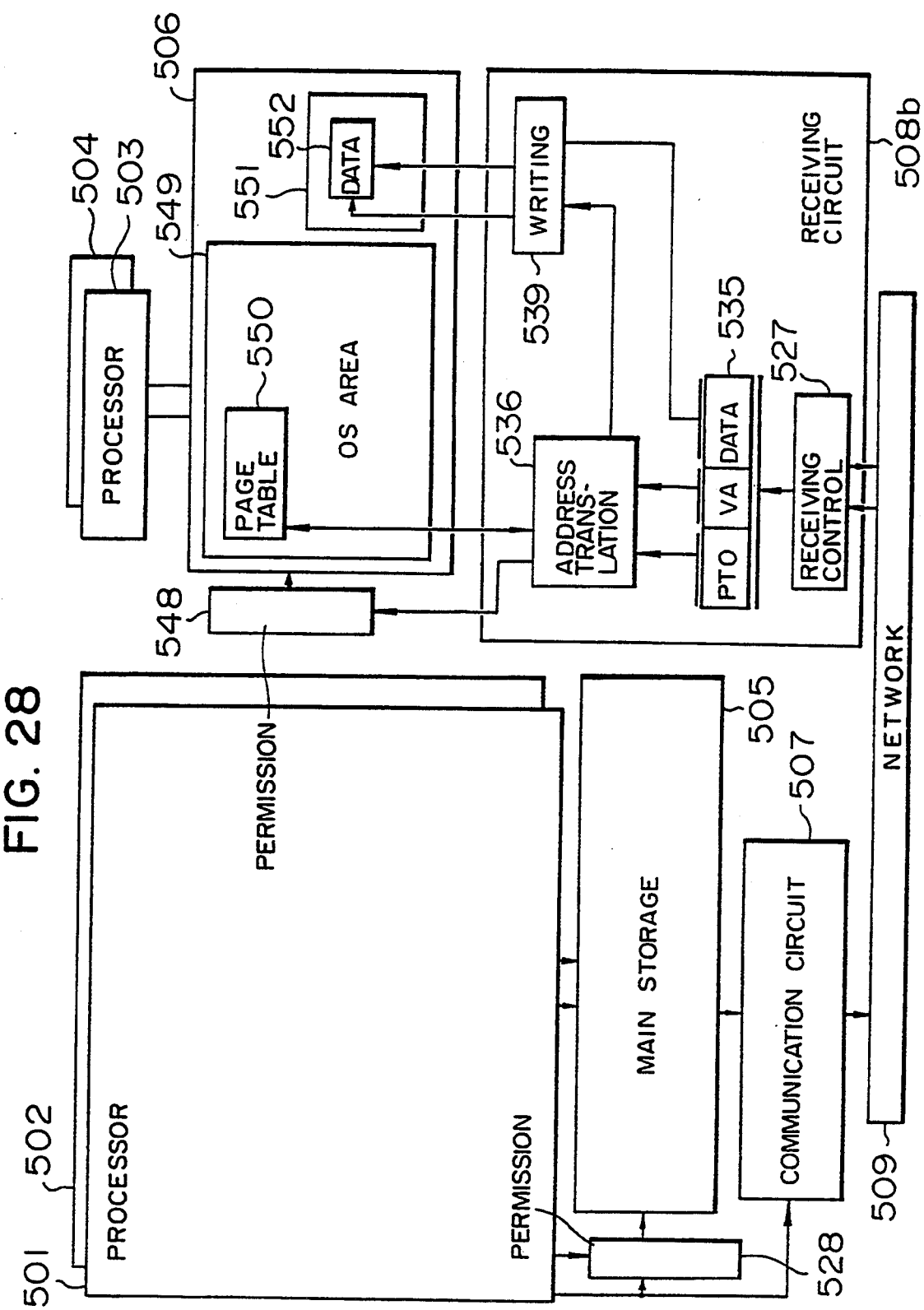
FIG. 28 is a configuration diagram of a parallel processor relating to a seventh embodiment of the present invention.

Configuration of the parallel processor relating to the present embodiment can be realized by excluding a part of the elements from the configuration of the fifth embodiment. FIG. 28 shows the configuration of the parallel processor relating to the present embodiment. FIG. 28 has a configuration which has excluded the address generating circuit 537, the write circuit 538, the receiving intercepting buffer 553, the data storage area 554 of the receiving intercepting buffer 553 and the lines connected to these elements, from the parallel processor of FIG. 17.

Operation of the parallel processor relating to the present embodiment is almost the same as the operation of the parallel processor of the fifth embodiment. Therefore, only different points will be explained.

A first difference exists in the initialization of the process for receiving data to be transmitted by the remote store instruction. According to the present embodiment, in executing the processing of the operating system for generating a virtual space to generate a process, a real storage area is secured of which capacity is the same as that of the virtual page that is necessary for the code area and the data area of the process after the space has been generated, and the real storage area is allocated to the virtual page completely, with the page-fix processing executed to all the virtual page.

A second difference exists in the receiving operation in the process of receiving data transmitted by the remote store instruction. As described above, the real storage is allocated to the virtual page of the process without exception, so that the processing of the address translation possibility inspection 160 is not necessary in FIG. 23 which shows the operation of the fifth embodiment. A series of operations starting from the address generation 170 are not required either. Accordingly, in the process of receiving data transmitted by the data transmission 156 in FIG. 23, it is only necessary to carry out the address translation 161 and then the data storing 162.

The above covers the explanation of the seventh embodiment of the present invention.

According to the seventh embodiment, the receiving intercepting buffer is not necessary, so that the real storage area and the management for the receiving intercepting buffer are not necessary either. Therefore, there is an effect that the overhead can be reduced in the processor which receives data.

Embodiment 8

Figure 29:
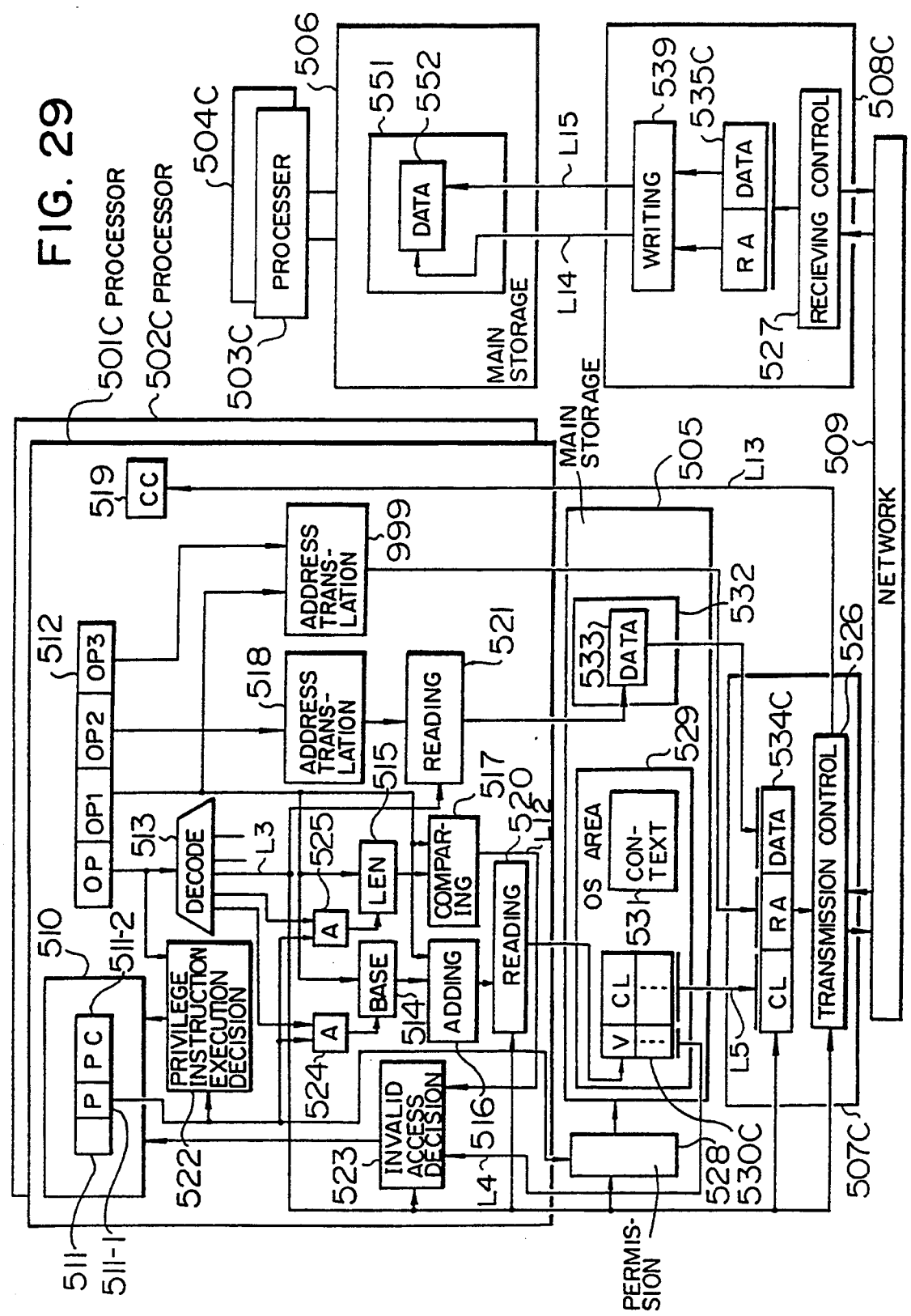
FIG. 29 is a configuration diagram of a parallel processor relating to an eighth embodiment of the present invention.
Figure 30:
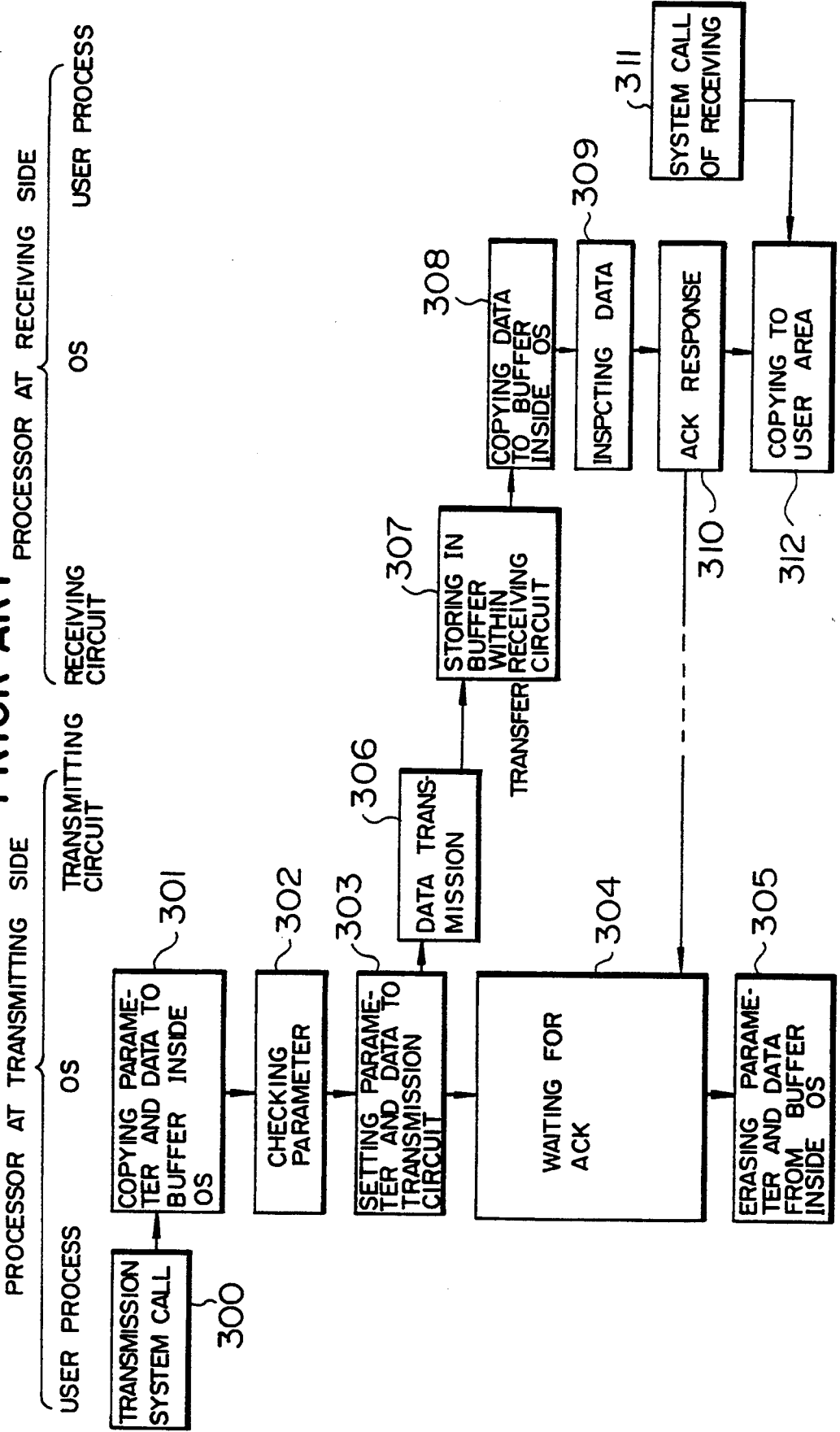
FIG. 30 is a diagram for explaining the operation of communication between processors according to the prior-art technique.

An eighth embodiment of the present invention is a modification of the seventh embodiment, with many common points. Therefore, only differences will be explained. FIG. 29 shows a configuration of the parallel processor relating to the eighth embodiment. In FIG. 29, structures of the elements having the same reference numbers as those in FIG. 17 are the same as the structures of the elements in the fifth embodiment.

In FIG. 29, 501c, 502c, 503c and 504c designate processors having the same structures. 505 and 506 designate memories. 507c and 508c designate a transmitting circuit and a receiving circuit respectively. 509 designates a network.

In the processor 501c, 999 designates an address translation circuit which is a configuration element newly introduced for the present embodiment. Other configuration elements of the processor 501c are located in the processor 501 in FIG. 17, having the same configuration elements with the same reference numbers.

In the main storage 505, 530c designates a PATH table. Each entry of the PATH table 530c comprises a field V and a field CL. 530c designates a table which is the PATH table 530 in the fifth embodiment after eliminating the PTO field.

In the transmitting circuit 507c, 534c designates a transmission register, which is constituted by three fields of CL, RA and data.

In the receiving circuit 508c, 535c designates a receiving register.

The present embodiment is a modification of the seventh embodiment in that the address translation operation relating to the virtual space in which data is to be written by the remote store instruction is executed by the processor at the transmitter side. The difference between the eighth embodiment and the seventh embodiment exists only in the operation of the openpath which is a system call in the seventh embodiment and the operation of the remote store instruction. Therefore, these operations will be explained. The openpath operation in the seventh embodiment is the same as that in the fifth embodiment.

The openpath operation will be explained first. The specification of the openpath is the same as that of the seventh embodiment. This system call is executed in the following manner.

First, a cluster makes an enquiry to the operating system of the cluster having the process which belongs to the same job of the process that has executed this system call, to check whether the process has an assigned name. The operating system of the cluster in which there is a process having the assigned name advises the number of the cluster and information for obtaining the real address from the virtual address in the virtual space uniquely corresponding to the assigned process, to the cluster which made the enquiry. In other cases, the enquired cluster advises the enquiring cluster that there is no process having the assigned name.

When a process having the assigned name has not been found as a result of the above enquiry, the system call returns to the user process a special value which shows that no process has been found that has the assigned name.

When a cluster in which there is a process having the assigned name has been found, an entry is optionally selected which has 1 in the V field out of the PATH table 30 corresponding to the user process that has executed the system call. Then, 0 is written in this V field and the number of the cluster in which the detected process exists is written in the CL field. Further, information for obtaining the real address from the virtual address in the virtual space uniquely corresponding to the assigned process and the entry number of the PATH table are set to the address translation circuit 999, and the entry number is returned to the user process. In other words, the entry number of the PATH table 530c becomes the value of the PATH.

As a result, the address translation circuit 999 can obtain the real address based on the value of the PATH and the virtual address of the virtual space corresponding to this PATH value. The address translation circuit 999 can be structured by the prior-art technique.

Operation of the remote store instruction will be explained below.

* Execution of the remote store instruction by the user process

First, the instruction is read from the main storage 505 according to the field 511-2 of the PSW 511 in the execution control circuit 510, and the instruction is stored in the instruction register 512. This instruction is a non-privileged instruction and therefore the privileged instruction execution decision circuit 522 does not produce an output signal. The instruction decoder 513 decodes the operation code stored in the field OP of the instruction register 512. When the read instruction has turned out to be the remote store instruction, a signal is outputted to the line L3 and the following series of operations are started.

* First Inspection

A value of the PATH stored in the first operand and a value stored in the PATH table base register 514 are added together by the adder 516, to obtain the entry address corresponding to the PATH in the PATH table 530c. The result of the entry address is outputted to the read circuit 520. The read circuit 520 refers to the main storage 505 based on the entry address outputted by the adder 516 after receiving a signal from the line L3, and produces a signal to the line L4 when the value of the V field of the entry is 1, Then the value of the PATH stored in the first operand is compared with the contents of the PATH table length register 515 by the comparator 517. When the value of the PATH is larger than the contents of the PATH table length register 515, as a result of the comparison, A signal is outputted to the line L12.

The invalid access decision circuit 523 decides, based on the signals of the lines L3, L4 and L12, whether the value of the PATH assigned by this instruction is for a valid data transmission or not. If the value is invalid, the decision circuit 523 produces an output signal to the execution control circuit 520. In this case, the invalid case means where a signal has been outputted to at least one of the lines L4 and L12 as a result of the execution of the signal.

The above covers the first inspection. Upon receiving a signal from the invalid access decision circuit 523 as a result of the first inspection, the execution control circuit 510 suppresses the execution of this instruction and produces an interruption in the processor 501.

* Second inspection

Based on the signal from the line L3, the state of the transmission control circuit 526 is checked.

When it has become clear, as a result of the second inspection, that the value set to the transmission register 534 by the previously executed remote store instruction has not been completely transmitted to the network 509, a condition code 1 is set to the condition code register 519 by the line L13, thus ending the execution of this instruction. When the value set to the transmission register 534 by the previously executed remote store instruction has been completely transmitted to the network 509, the following operation is executed.

* Setting of the CL field

At first, in the same manner as the case of the first inspection, the read circuit 520 refers to the main storage 505 based on the entry address outputted by the adder 516, and outputs the contents of the CL field of this entry to the line L5. The transmission register 534c sets the value outputted to the line L5 to the CL field based on the signal of the line L3.

* Setting of the RA field

Next, the value of the PATH stored in the first operand and the virtual address stored in the third operand are inputted to the address translation circuit 999. The address translation circuit 999 outputs the real address of the data transmission destination. The transmission register 534c sets the value outputted by the address translation circuit to the RA field, based on the signal of the line L3.

* Setting of the data field

Then, the address translation circuit 518 translates the virtual address stored in the second operand into the real address and outputs the converted real address to the read circuit 521. The read circuit 521 reads the main storage 505 by the real address based on the signal of the line L3 and outputs the data to be transmitted, to the data field of the transmission register 534c. The transmission register 534c sets the data to be transmitted, to the data field based on the signal of the line L3.

* Data transmission

When the setting to the transmission register 534c has been completed as described above, a condition code 0 is set to the condition code register 519 by the line L13, thus ending the execution of this instruction. The transmission control circuit 526 which has received the signal of the line L3 starts the sending of the contents of the transmission register 534c to the network 509.

Whether the transmission to the network has been successful or not can be checked by the conditional branch instruction which reflects the value of the condition code. When it has become clear by the value of the condition code that the transmission to the network has not been successful, the instruction is executed again.

The network 509 transmits a message to a receiving circuit of the cluster assigned in the message, for example, to the receiving circuit 508c. As a result, the RA field and the data field of the transmission register 534c are set to the RA field and the data field of the receiving register 535c respectively through the receive control circuit 527.

Then, the following operation is carried out.

* Data writing

The write circuit 539 outputs the contents of the RA field of the receiving register 535c to the line L14 and outputs the contents of the data field of the receiving register 535c to the line L15, and then writes the contents of the data field of the register 535c to the data storage area 552 of the virtual space 551, thus ending the operation.

The data transmission is completed in the above.

According to the present embodiment, the operation of the receiving circuit of the cluster in which a data receiving process exists is simplified. Therefore, in comparison with the seventh embodiment, the operation of reading data and storing the data in the main storage is made faster when data transmissions from many processes are concentrated into one cluster. As a result, overhead of the communications can be further reduced.

Embodiment 9

A ninth embodiment relates to the case where a processor requests an external device, for example, an input and output device, for data.

According to the prior-art technique, when the processor requests an external device for data, the operating system first prepares a memory area for writing data and protects the memory area from being paged out. For this purpose, there is a method for securing the memory area in the real storage, for example, or for securing the memory area in the page-fixed virtual storage area. Then, a command including the address is transmitted to the external device.

When the external device having received the command has prepared data to be written in the memory area, the external device writes the data in the above area which has not been paged out.

According to the above prior-art technique, when the operating speed of the external device is slower than the operating speed of the processor, the memory area prepared for the external device can not be utilized for executing the program the processor for the period during the response time of the external device.

To solve the above problem, the present embodiment shows a method where no problem occurs if the memory area in which the external device is to write data has been paged out.

In order to achieve the above object, a receive intercepting buffer as explained in the fifth embodiment of the present invention may be used. To be more specify the receiving circuit 508 and the receive intercepting buffer 553 shown in the fifth embodiment are set between the external device and the processor.

When the processor requests the external device for data writing, the area for writing is secured on the normal virtual storage area and a virtual address of this area and a PTO (page table origin) command corresponding to the virtual space including this area are transmitted to the external device. When the external device has started operation of reading the disk unit, for example, and has prepared data to be written, the external device transmits the PTO, the virtual address and the data to the receiving circuit which is connected to the processor that has requested the data. Then, in the manner same as the fifth embodiment, the receiving circuit decides whether the real storage area corresponding to the virtual storage area in which the data is to be written by the address translation circuit has been allocated or not. If the real storage area has been allocated, the data is written in this area. If the real storage area has not been allocated because of the page-out, an area that can be utilized in the receive intercepting buffer is allocated, in the same manner as the address generating circuit 537 in the receiving circuit 508, and the PTO, the virtual address and the data are written in this area. Then, the receiving circuit generates an interruption in the processor. As a result, the processor pages in the area paged out by the PTO and the virtual address stored in the receive intercepting buffer, and then writes the data in this area.

According to the present embodiment, the area in which the external device is to write data can be set as the area for normal paging. Accordingly, even if the operating speed of the external device is slower than the operating speed of the processor, the external device does not occupy the memory area prepared for the external device during the response time period of the external device, so that the memory area can be utilized for the execution of the program by the processor.

According to the present invention, for carrying out data transmissions between user processes, it is necessary to initialize by communications between the operating systems of each cluster when the user processes are to be started. However, in the real data transmission between the user processes, when transmitting data in the virtual space of the user process in a certain cluster to the virtual space of the user process in other cluster, the data can be transmitted directly without copying the data to the buffer area in the operating system. Accordingly, it is possible to carry out data transmission with a small overhead and without making unnecessary alternations to the virtual space of the user process having no relation to the data transmission.

What is claimed is:

1. A multiple processor system, comprising:
   a first cluster including at least one first processor and a first storage for holding data and a program executed by said first processor, said first cluster executing at least one first process under control of a first operating system of said first cluster, said first process being assigned with a first virtual address space;
   a second cluster including at least one second processor and a second storage for holding data and a program executed by said second processor, said second cluster executing at least one second process under control of a second operating system of said second cluster, said second process being assigned with a second virtual address space which includes a virtual communication area for data transferred from other clusters including said first cluster, said second memory holding a real communication area assigned to said virtual communication area at a position of said second memory determined by said second operating system, and a base address of said real communication area written by said second operating system into said second memory, said base address indicating a top position of said real communication area within said second memory;
   a network for connecting said first cluster and said second cluster;
   wherein said first cluster comprises:
   a send circuit connected to said first processor and said network for transmitting a packet to said second cluster by way of said network, said packet including: (1) transmission data designated by said first process, (2) process-dependent information predetermined by said second operating system for said second process, and (3) a data offset address indicative of a difference between a base address of said virtual communication area and a virtual write address at which said transmission data is to be written within said second virtual address space; and
   wherein said second cluster comprises;
   a receive circuit connected to said network for receiving by way of said network, said transmission dam, said process-dependent information and said dam offset address;
   a base address read circuit connected to said second memory and said receive circuit and responsive to a received said process-dependent information for generating a read address of a location within said second memory where the base address of the real communication area provided for said second process is held and for reading said base address from the location;
   an address adder connected to said receive circuit and said read circuit for adding a received said data offset address to a read out said base address to generate a real address of a location within said real communication area at which said transmission data is to be written; and
   a write circuit connected to said second memory and said address adder for writing, received said transmission dam at a generated said real address of said second memory.

2. A system as claimed in claim 1, wherein received said process-dependent information is a communication area identifier assigned to said real communication area for said second process.

3. A system as claimed in claim 2,
   wherein said second memory holds a communication area table which includes a plurality of base addresses, each for one of a plurality of real communication areas held in said second memory, said real communication areas being allocated to a plurality of virtual communication areas belonging to virtual spaces assigned to a plurality of processes being executed by said second cluster; and
   wherein said base address read circuit generates an address of a location within said communication area table where the base address of said real communication area provided for said second process is held, in response to a received said communication area identifier.

4. A system as claimed in claim 3,
   wherein said base address read circuit comprises;
   a register for holding an origin address of said communication area table held in said second memory;
   an offset calculation circuit for calculating an offset address indicative of a difference between a top position of said communication area table and a position within said communication area table where the base address of said real communication area provided for said second process is held, based upon a received said communication area identifier; and
   an adder adding a calculated said offset address to said origin address held in said register.

5. A system as claimed in claim 3,
   wherein said send circuit further transfers by way of said network, a length of said transmission data so that said length is received by said receive circuit;
   wherein said communication area table further includes a plurality of lengths of said plurality of real communication areas;
   wherein said base address read circuit further reads one of the plurality of lengths which is a length of said real communication area provided for said second process; and
   wherein said second cluster further comprises;
   a judge circuit for judging if a sum of a received said length of said transmission data and a received said data offset address is greater than a read length of said real communication area, and for prohibiting said write circuit from writing received said transmission data into said second memory, when the sum has been determined as being greater than the read length.

6. A system as claimed in claim 1;
wherein said send circuit further transmits a flag offset address by way of said network to said second cluster so that said flag offset address is received by said receive circuit, said flag offset address indicating a difference between the base address of the virtual communication area and a virtual write address at which a data receipt flag is to be written within said second virtual address space and being predetermined for said virtual write address;
wherein said address adder further adds a received said flag offset address to a read out said base address to generate a real write address of a location within said real communication area at which a data receipt flag is to be written; and
wherein said write circuit further generates a data receipt flag and writes said data receipt flag at a generated said real write address of said second memory.

7. An inter-process data transmission method in a multiple processor system which includes first and second clusters, and a network for connecting said first and second clusters, said first cluster including at least one first processor and a first storage for holding data and a program to be executed by said first processor and executing at least one first process under control of a first operating system of said first cluster, said first process being assigned with a first virtual address space which includes a first virtual communication area, said second cluster including at least one second processor and a second storage for holding data and a program to be executed by said second processor and executing at least one second process under control of a second operating system of said second cluster, said second process being assigned with a virtual address space which includes a virtual communication area,
said method comprising the steps of:
allocating, using said first operating system, an area provided within said first memory at a location determined by said first operating system to said first virtual communication area as a real communication area for said first process;
allocating, using said second operating system, an area provided within said second memory at a location determined by said second operating system to said second virtual communication area as a real communication area for said second process;
writing, using said first process, transmission data within said first virtual communication area, thereby writing said transmission data into said real communication area for said first process;
designating, using said first process: (1) a name of said second process as a name of a destination process, (2) a virtual data read address of said first virtual space from which transmission data is to be read, (3) a length of said transmission data, and (4) a virtual data write address within said second virtual space at which said transmission data is to be written;
supplying, using said first cluster, a cluster number predetermined for said second cluster and an identifier predetermined for said real communication area provided for said second process, in response to said designated name of said second process;
calculating, using said first cluster, a data offset address indicative of a difference between a base address predetermined for second virtual communication area assigned to said second process and said virtual data write address designated by said first process;
translating, using said first cluster, said designated virtual dam read address into a real data read address for said first memory, by means of an address translation table provided by said first operating system in said first memory;
reading, using said first cluster, said transmission data from said first memory, based upon said generated real data read address and a designated said length of said transmission data;
generating, using said first cluster, a packet including: (1) the selected cluster number of said second cluster. (2) the selected identifier of said real communication area provided for said second process, (3) a calculated said data offset address, and (4) said transmission data as read out;
sending, from said first cluster, said packet to said network;
receiving, at said second cluster, by way of said network, said identifier,
said data offset address and said transmission data included in said packet;
generating, using said second cluster, an address of a location of said second memory at which the base address of the real communication area provided for said second process is held, in response to a received said identifier;
adding, using said second cluster, a received said data offset address to a selected said base address to generate a real data write address of one location within said real communication area at which said transmission data is to be written; and
writing, using said second cluster, received said transmission data at a generated said real data write address of said second memory, based upon a received length.

8. A method as claimed in claim 7, further comprising the steps of:
writing, using said first operating system, relocation information for processes being executed by clusters other than said first cluster into said first memory, said relocation information including: (1) a process name of each of said processes, (2) a cluster number of one of said other clusters which is executing said each process, and (3) an identifier of a real communication area provided for said each process;
writing, using said second operating system, communication information for processes being executed by said second cluster into said second memory, said communication information including: (1) an identifier of a real communication area provided for each of said processes, and (2) a base address of said real communication area for said each process, the base address indicating a top position of said real communication area for said each process within said second memory;
wherein said supplying step executed by said first cluster includes substeps of reading said cluster number of said second cluster and said identifier of said real communication are provided for said second process from said relocation information held in said first memory, in response to a designated said name of said second process, wherein said generating step executed by said second cluster includes substeps of reading out the base address of the second real communication area from said communication information held in said second memory.

9. A method as claimed in claim 8, further comprising the steps of:

generating, using said first cluster, a communication request after said translating step executed using said first cluster, which is before said reading step executed using said first cluster, said communication request including: (1) a supplied said cluster number of said second cluster (2) a supplied said identifier of said real communication area for said second process, (3) a calculated said dam offset address, (4) said length of said transmission dam as designated by said first process and (5) said real dam read address as obtained by the translating step;

wherein said reading step of said transmission data is carried out based upon said real data read address included in a generated said communication request;

wherein said generating step of the communication request makes use of (1) a selected said cluster number of said second cluster (2) a selected said identifier of said real communication area for said second process, and (3) said length of said transmission data all included in a generated said communication request; and wherein said reading step of said transmission data is carried out based upon said real data read address included in the generated said communication request.

10. A method as claimed in claim 9, wherein said designating step includes a step of calling, using said first process, a data transmission library with an argument, said argument including: (1) a name of said second process as a name of a destination process, (2) a virtual read address of said first virtual space from which transmission data is to be read, (3) a length of said transmission data, and (4) a virtual write address within said second virtual space at which said transmission data is to be written;

wherein said supplying step, said calculating step, said translating step and said generating step of said communication request are executed by said data transmission library; and wherein said reading step of said transmission data is executed by a send data read circuit provided in said first cluster.

11. A method as claimed in claim 10, further comprising the steps of:

writing, using said library, a generated said communication request into said first memory; and reading, using said send dam read circuit, said communication request from said first memory before reading said transmission data from said memory.

12. A method as claimed in claim 9, wherein said designating step includes a step of providing, using said first process, a data transmission system call to said first operating system with an argument, said argument including: (1) a name of said second process as a name of a destination process, (2) a virtual read address of said first virtual space from which transmission data is to be read, (3) a length of said transmission data, and (4) a virtual write address within said second virtual space at which said transmission data is to be written;

wherein said selecting step, said calculating step, said translating step and said generating step of the communication request are executed by said first operating system: and wherein said reading step is executing by a send data read circuit provided in said first cluster.

13. A method as claimed in claim 12, further comprising the step of:

supplying, using said first operating system, said generated communication request to said send data read circuit; and wherein said send data read circuit reads said transmission data from said first memory in response to said real read address included in a supplied said communication request.

14. A method as claimed in claim 7, further comprising the steps of:

designating, using said first process, a virtual flag write address within said second virtual space at which a data receipt flag is to be written;

calculating, using said first cluster, a flag offset address indicative of a difference between the base address predetermined for said second virtual communication area and said virtual flag write address designated by said first process;

generating, using said first cluster, said packet so that said packet includes said calculated flag offset address so that said flag offset address is received by said second cluster;

adding, using said second cluster, a received said flag offset address to a selected said base address to generate a real flag write address of another location within said real communication area at which a dam receipt flag is to be written;

writing, using said second cluster, a data receipt flag at a generated said real flag write address of said second memory;

repeatedly reading, using said second process, said another location within said second memory to detect if a data receipt flag has been written into said another location: and reading, using said second process, said transmission data from said one location within said second memory after it has been detected that the data receipt flag has been written into said another location.

15. A multiple processor system, comprising:

a first cluster including at least one first processor and a first storage for holding data and a program executed by said first processor and executing at least one first process under control of a first operation system of said first cluster, said first process being assigned with a first virtual address space, a second cluster including at least one second processor and a second storage for holding data and a program executed by said second processor and executing at least one second process under control of a second operating system of said second cluster, said second process being assigned with a second virtual address space;

a network for connecting said first cluster and said second cluster;

said first cluster comprising:

a send circuit connected to said first processor and said network for transmitting a packet to said second cluster by way of said network, said packet including: (1) transmission data designated by said first process, (2) a virtual write address designated by said first process as an address of a location at which said transmission data is to be written within said second virtual space, and (3) an origin address of a page table used for address translation of the virtual write address; and said second cluster comprising:

a receive circuit connected to said network for receiving by way of said network, said transmission data, said virtual write address and said origin address;

an address translation circuit connected to said second memory and said receive circuit and responsive to a received said original address for reading the page table held in said second memory and for translating a received said virtual write address into a real write address;

a write circuit connected to said second memory and said address translation circuit for writing a received said transmission data at a generated said real write address of said second memory.

16. A multiple processor system, comprising:

a first cluster including at least one first processor and a first storage for holding data and a program executed by said first processor and executing at least one first process under control of a first operating system of said first cluster, said first process being assigned with a first virtual address space;

a second cluster including at least one second processor and a second storage for holding data and a program executed by said second processor, and executing at least one second process under control of a second operating system of said second cluster, said second process being assigned with a second virtual address space;

a network for connecting said first and second clusters;

said first cluster including;

a path table provided by said first operating system and held in said first memory, said path table having cluster numbers of other clusters;

a cluster number read circuit responsive to a send instruction issued by said first process for reading a cluster number of said second cluster in response to path relation information designated by said send instruction which requires transfer of transmission data to said second process;

a data read circuit responsive to a virtual data read address designated by said send instruction for reading transmission data from said first memory;

an address translation circuit responsive to said path selection information designated by said send instruction for translating a virtual data write address designated by said send instruction into a real data write address of said second memory at which transmission data is to be written; and a send circuit for transferring a packet to said network, said packet including a read said read cluster number, said transmission data and said real data write address;

said second cluster including;

a packet receive circuit connected to said network for receiving said packet; and a data write circuit for writing said transmission dam included in a received said packet at a location having said real data write address within said second memory.

* * * * *